(12) United States Patent
Brown et al.

(10) Patent No.: US 6,190,585 B1
(45) Date of Patent: *Feb. 20, 2001

(54) INSULATED-RUNNER INJECTION MOLDING METHOD WITH METERED INJECTION TO FORM INSULATED RUNNER

(75) Inventors: Paul Philip Brown, San Diego, CA (US); Jens Ole Sorensen, Cayman Kai (KY)

(73) Assignee: Universal Ventures (KY)

( * ) Notice: Under 35 U.S.C. 154(b), the term of this patent shall be extended for 0 days.

This patent is subject to a terminal disclaimer.

(21) Appl. No.: 09/238,308

(22) Filed: Jan. 28, 1999

Related U.S. Application Data

(63) Continuation-in-part of application No. 09/178,378, filed on Oct. 23, 1998.

(51) Int. Cl.[7] .......................... B29C 45/27; B29C 45/34; B29C 45/40; B29C 45/76
(52) U.S. Cl. .................... 264/40.1; 264/40.6; 264/328.1; 264/328.8; 264/328.16; 264/334; 425/73; 425/135; 425/145; 425/152
(58) Field of Search ................................ 264/40.1, 40.5, 264/39, 328.1, 328.8, 328.11, 328.16, 334, 297.2, 40.6; 425/135, 136, 137, 145, 152, 154, 73, 546, 588, 589, 595, 574, 575, 556, 552, 572, 573

(56) References Cited

U.S. PATENT DOCUMENTS 3,021,568  2/1962  Scott, Jr. .
3,093,865 * 6/1963  Peters et al. .................... 264/328.16

(List continued on next page.)

OTHER PUBLICATIONS

Du Bois and Pribble, Plastic Mold Engineering Handbook, 4th Ed., Van Nostrand Reinhold, New York, 1987, pp. 372–376.

Menges and Mohren, "How to Make Injection Molds", 2nd Ed., Hansen Publishers, Munich, 1993, pp. 207–209.

Temesvary, "Mold Design for High Speed Production of Disposables" SPE Journal, Feb. 1968, vol. 24, pp. 25–30.

(List continued on next page.)

*Primary Examiner*—Jill L. Heitbrink
(74) *Attorney, Agent, or Firm*—Edward W. Callan

(57) ABSTRACT

Various steps in the operation of an insulated runner injection molding system are automated by computer generated responses to various sensing steps or other steps to thereby reduce the performance requirements of the system operator. In automatic response to a manual operation incident to closure of a machine gate subsequent to removal of a sprue from channel-encasing mold parts, a computer causes the molding system to be adjusted to enable injection of molten plastic into an insulated runner channel to form the insulated runner and through the insulated runner into mold-cavities. In automatic response to sensing such readjustment of the molding system, the computer causes a predetermined quantity of molten plastic to be metered for injection to form the insulated runner. In automatic response to sensing such metering the computer causes the metered quantity to be injected into the channel. In automatic response to sensing completion of such injection, and after a interval during which the injected plastic cools to form the insulated runner, the computer causes further plastic material to be injected through the insulated runner into the mold cavities in accordance with parameters of a molding sequence including a plurality of injection molding cycles. The predetermined metered quantity of molten plastic material that is injected to form the insulated runner covers the mold-part-separation lines, but does not extend to any of the gates between the channel and the mold cavities.

39 Claims, 14 Drawing Sheets

U.S. PATENT DOCUMENTS

| | | | |
|---|---|---|---|
| 3,159,878 | * 12/1964 | Scott, Jr. et al. | 264/328.16 |
| 3,254,371 | * 6/1966 | Rees | 425/136 |
| 3,520,026 | 7/1970 | Stidham et al. . | |
| 3,537,146 | 11/1970 | Caveney . | |
| 3,728,057 | * 4/1973 | Grundmann et al. | 425/136 |
| 3,740,179 | 6/1973 | Schmidt . | |
| 3,776,676 | * 12/1973 | Kessler | 425/441 |
| 3,840,312 | * 10/1974 | Paulson et al. | 425/149 |
| 4,072,737 | 2/1978 | Wolf . | |
| 4,421,467 | * 12/1983 | Richmond | 425/136 |
| 4,427,618 | * 1/1984 | Sorensen | 264/328.8 |
| 4,965,028 | 10/1990 | Maus et al. . | |
| 4,975,227 | * 12/1990 | Kamiguchi | 264/40.1 |
| 5,034,168 | * 7/1991 | Matsumoto et al. | 264/40.1 |
| 5,069,615 | 12/1991 | Schad et al. . | |
| 5,551,863 | 9/1996 | Hepler . | |
| 5,554,395 | 9/1996 | Hume et al. . | |

OTHER PUBLICATIONS

Filbert, Jr. and Williams, "Runnerless Mold Design", Technical Report 196, E. I du Pont De Nemours & Co., Inc. Delaware, 1977.

Dym, "Injection Molds and Molding", Second Edition, Van Norstrand Reinhold, New York, 1987, pp. 229–232.

Pye, "Injection Mold Design", Fourth Edition, Longman Scientific & Technical, Harlow, 1989, pp. 501–503.

Csaszar, "Runnerless Molding Without Hangups", SPE Journal, Feb. 1972, vol. 28, pp. 20–23.

* cited by examiner

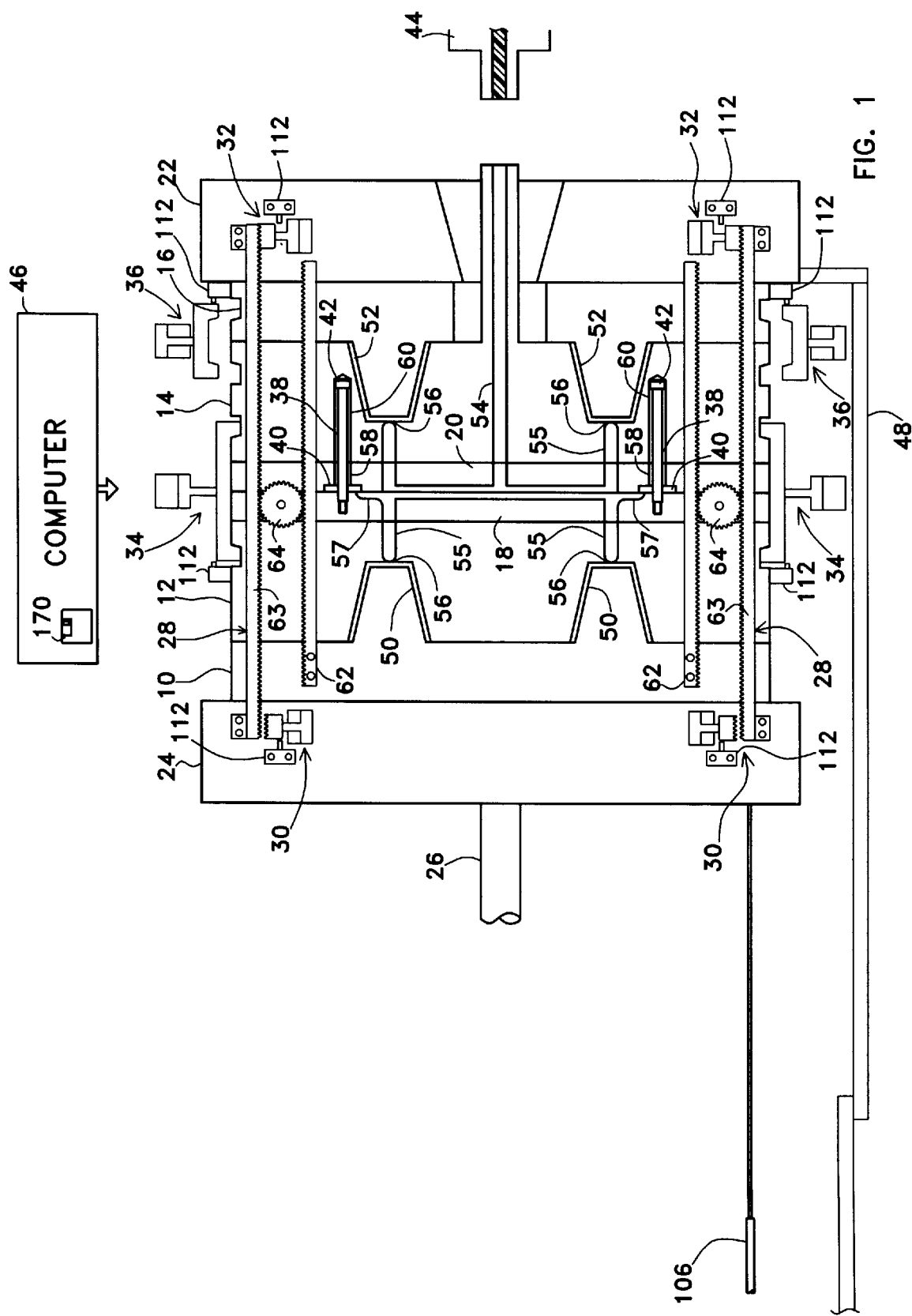

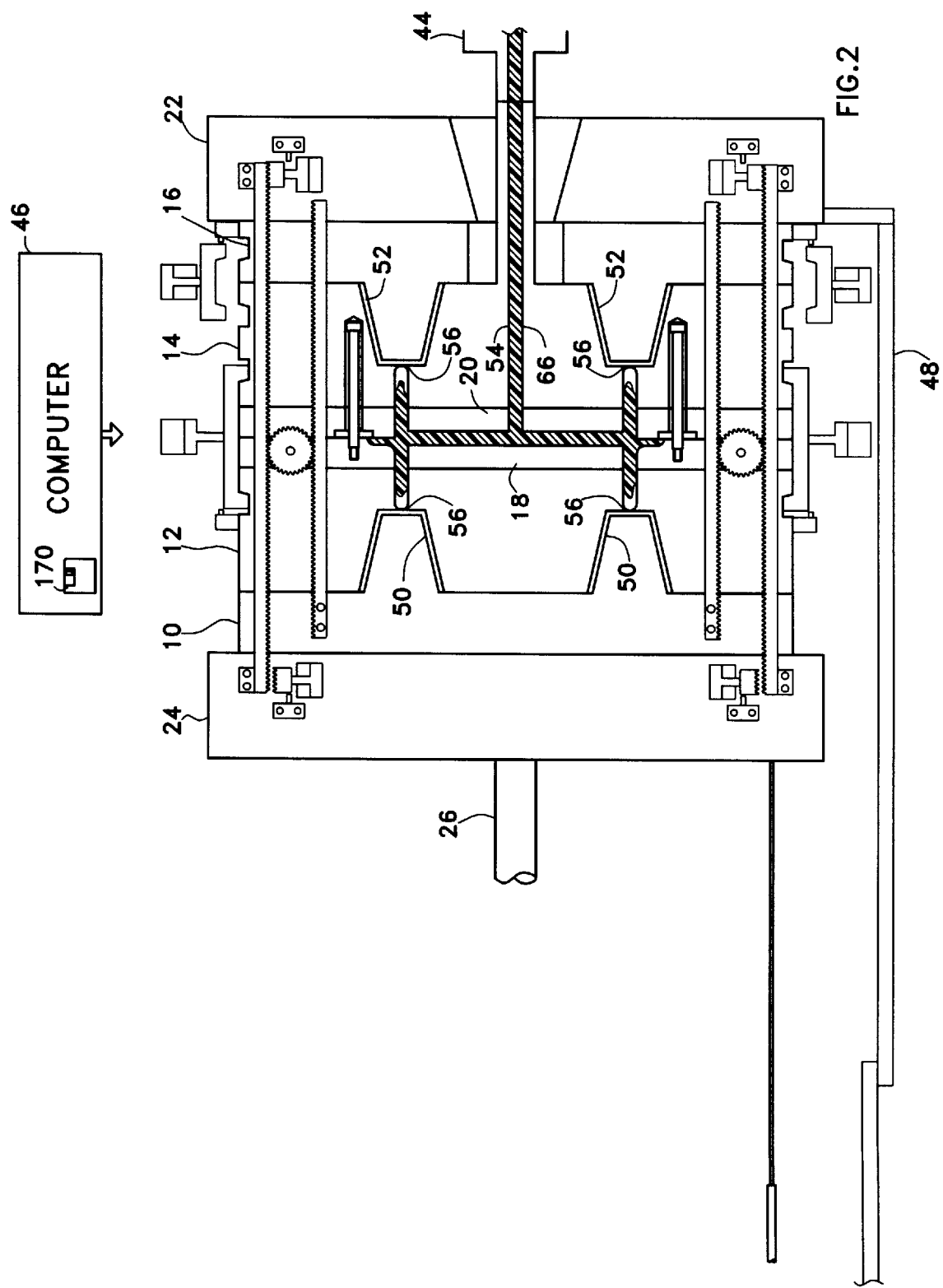

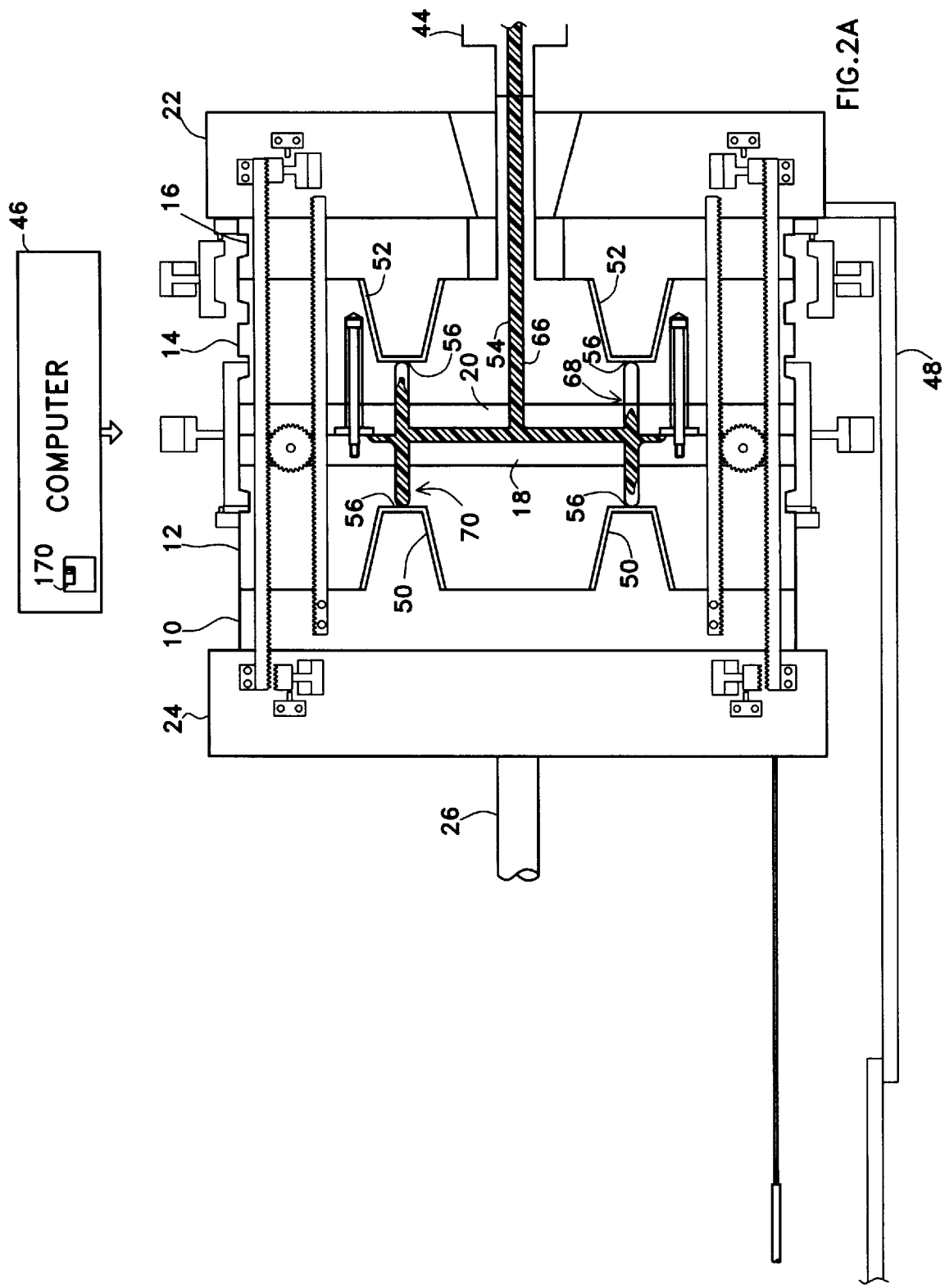

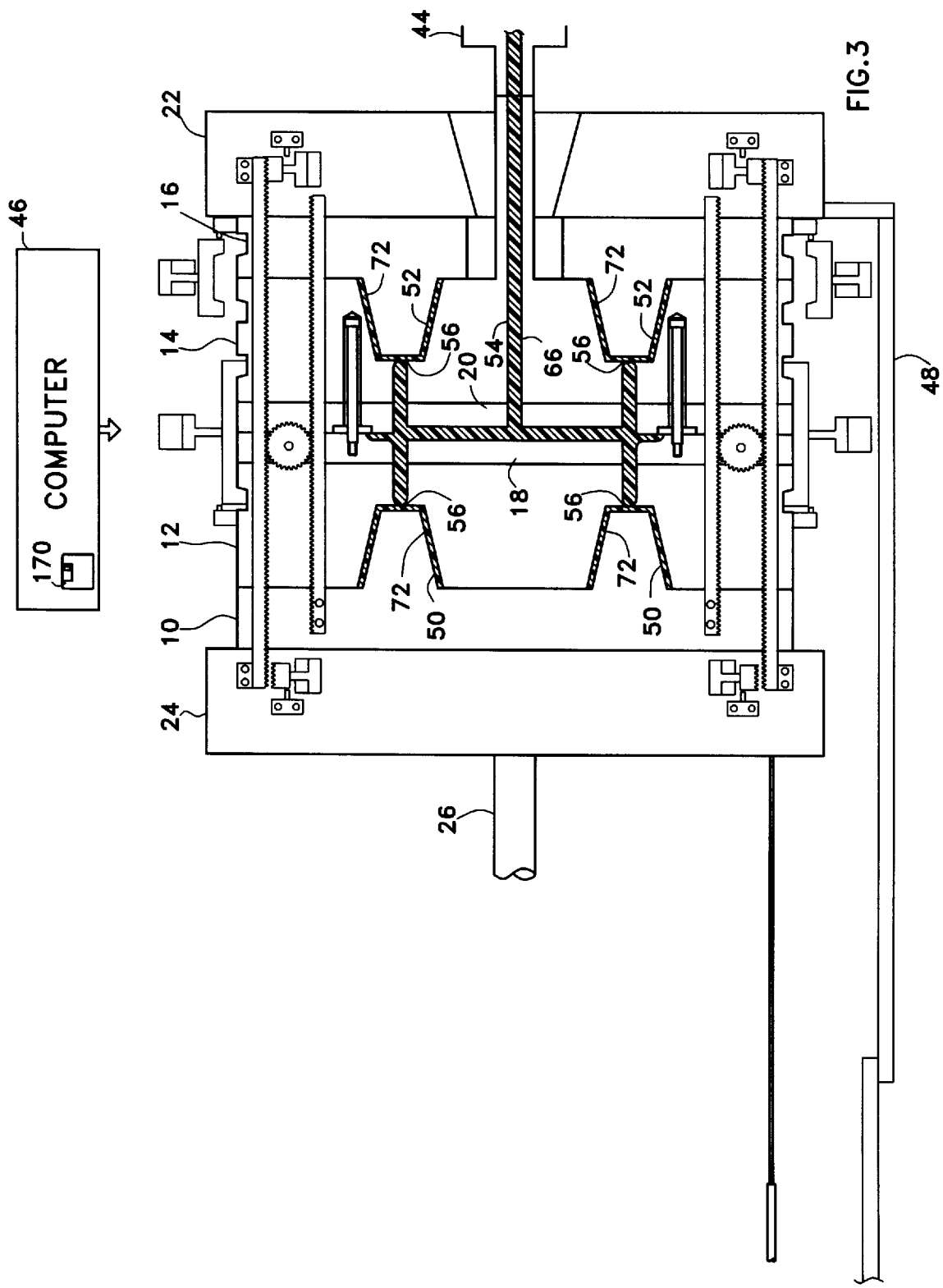

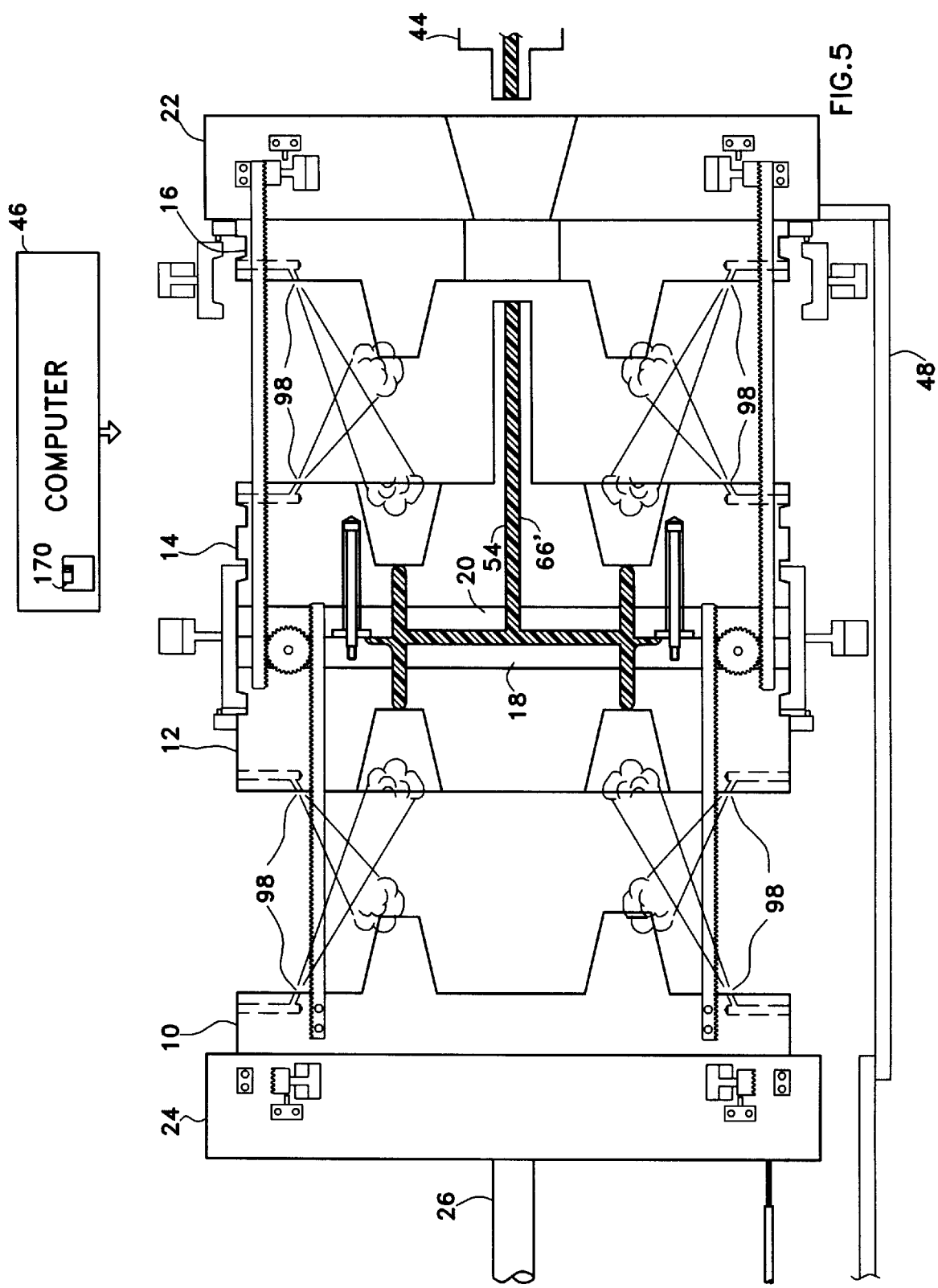

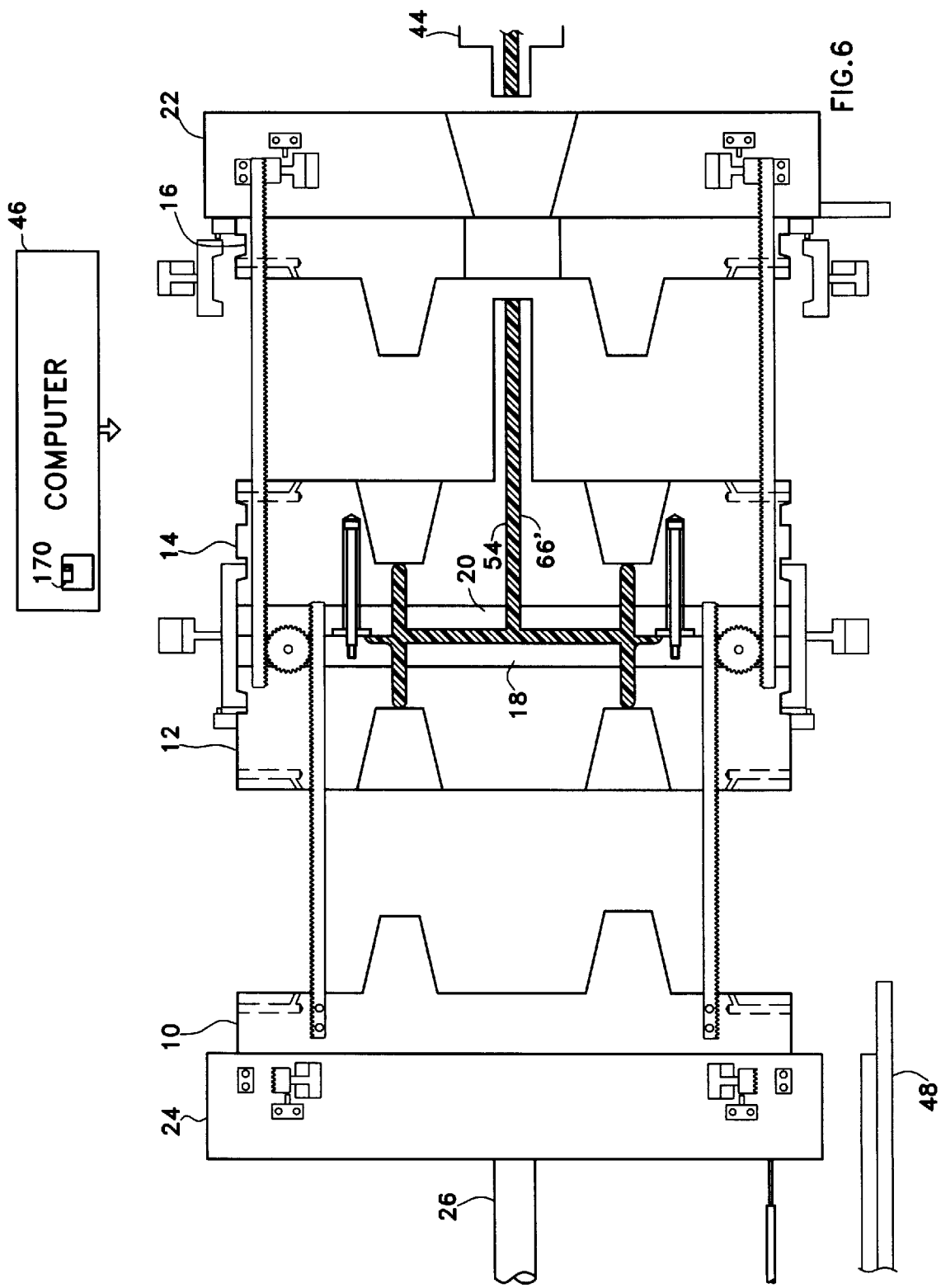

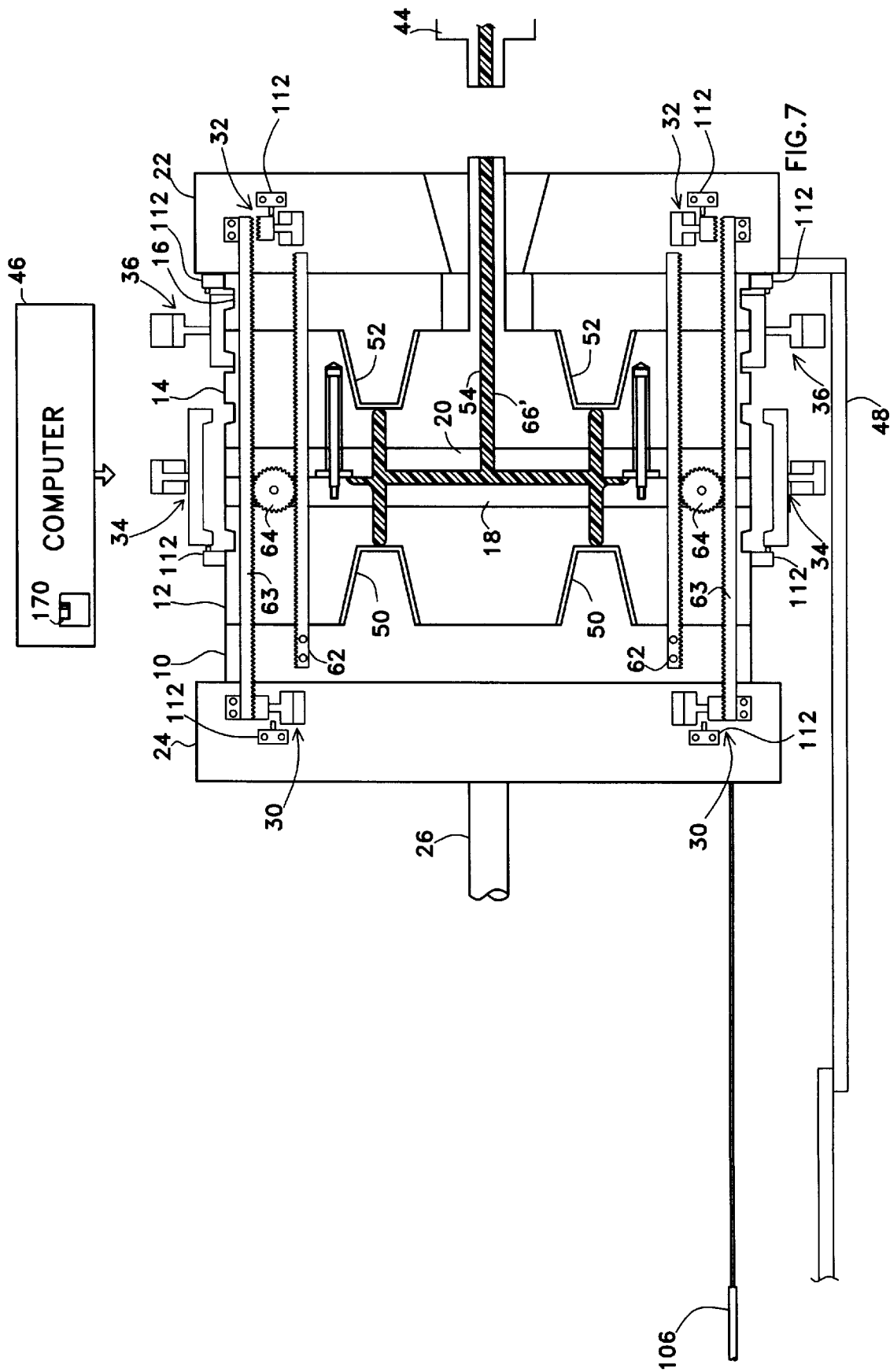

INSULATED-RUNNER INJECTION MOLDING METHOD WITH METERED INJECTION TO FORM INSULATED RUNNER

CROSS-REFERENCE TO RELATED APPLICATION

This is a continuation-in-part of copending U.S. application Ser. No. 09/178,378 filed Oct. 23, 1998.

BACKGROUND OF THE INVENTION

The present invention generally pertains to injection molding and is particularly directed to improved insulated runner injection molding methods.

An insulated runner system includes mold-cavity-encasing mold parts and channel-encasing mold parts. The mold-cavity-encasing mold parts encase the mold cavities; and the channel-encasing mold parts encase a channel, in which injected plastic material forms an insulated runner with a solidified insulating plastic shell and a molten plastic core for conducting injected molten plastic material toward the mold cavities. A preferred method of operating and controlling an insulated runner injection molding system includes the step of:

(a) injecting molten plastic material into the channel to form an insulated runner in the channel and into the at least one mold cavity in accordance with parameters of a molding sequence including a plurality of injection molding cycles.

The core eventually solidifies to form a sprue when the molding sequence is interrupted or after a run of normal production cycles. Upon occurrence of full solidification of the insulated runner to form the sprue molten plastic can no longer be injected through the insulated runner channel, whereby the injection molding system automatically ceases operation, an alarm is provided to alert a system operator to such occurrence, and an end-of-sequence signal is provided. The system operator responds to the alarm and/or a status indication provided pursuant to the end-of-sequence signal by performing a series of steps required for removing the sprue from the channel-encasing mold parts and enabling the molding system for another molding sequence including a plurality of injection molding cycles.

Initially, the operator causes the mold-cavity-encasing mold parts to be disengaged. Then the operator causes the opening of a machine gate that controls access to a space between the disengaged mold-cavity-encasing mold parts, whereupon the operator inspects the disengaged mold-cavity-encasing mold parts and causes any debris to be removed from the disengaged mold-cavity-encasing mold parts.

Subsequent to inspection of the disengaged mold-cavity-encasing mold parts, the operator causes the closing of the machine gate, and then causes re-engagement of the mold-cavity-encasing mold parts. Then, after causing the machine gate to be opened, the operator causes the molding system to be adjusted to enable disengagement of the channel-encasing mold parts. Then, after causing the machine gate to be closed, the operator causes the channel-encasing mold parts to be disengaged. The operator then causes the opening of the machine gate, whereupon the operator causes the sprue to be removed from the channel-encasing mold parts. The operator then inspects the disengaged channel-encasing mold parts and causes any debris to be removed from the disengaged channel-encasing mold parts.

Subsequent to removal of the sprue and inspection of the disengaged channel-encasing mold parts, the operator causes the closing of the machine gate, and then causes re-engagement of the channel-encasing mold parts. Then, after causing the machine gate to be opened, the operator causes the molding system to be adjusted to prevent disengagement of the channel-encasing mold parts. Then, after causing the machine gate to be closed, the operator causes plastic material to be injected into the insulated runner channel and into the mold cavities in accordance with the molding sequence having the predetermined plurality of injection molding cycles.

The operator causes the above-described steps other than the inspection steps to be performed by selectively operating a myriad of control buttons that actuate various mechanisms.

For many years hot runner injection molding methods and systems have been favored over insulated runner injection molding methods and systems for most injection molding applications. In a hot runner injection molding system, the mold parts that encase a runner-system channel, in which injected molten plastic material flows from an injection unit to product-forming mold cavities, are heated in order to maintain the plastic material within the runner-system channel in a molten state.

There is an inherent inefficiency in hot runner injection molding. A substantial amount of electrical energy is required to heat the runner-system channel, and heat leaks from the channel-encasing mold parts to the mold parts that encase the mold cavities to thereby heat the mold cavities and retard the cooling required to solidify products formed in the mold cavities. Consequently, another substantial amount of electrical energy is required to cool a coolant that is circulated in the mold-cavity-encasing mold parts to counteract the heat that is leaked from the heated channel-encasing mold parts. Even with such counteractive cooling, the heat leaked from the channel-encasing mold parts still retards cooling of the products formed in the mold cavities to such an extent as to substantially increase the duration of each molding cycle.

There has been a long felt need to overcome the above-described energy-loss and cooling inefficiency problems incident to hot runner injection molding. Even though these inefficiency problems can be overcome by utilizing an insulated runner injection molding system, since operation of an insulated runner injection molding system does not require that the channel-encasing mold parts be heated, the state of the art of insulated runner injection molding has had various perceived problems associated therewith, as will be discussed below, such that insulated runner injection molding is not currently in common use and is largely thought of by those of ordinary skill in the art as a thing of the past.

The literature available to persons wishing to learn about the art of insulated runner injection molding is contradictory and sometimes misleading, such as in the following examples.

Temesvary "Mold Design for High Speed Production of Disposables", SPE Journal, February 1968—Vol. 24, page 25, states at page 27, "The advantage of the insulated runner system lies mainly in its simplicity and strength. Its disadvantage is that with every shut down, the solidified runner must be removed and, of course, startup is more critical and difficult than start up of the hot runner mold." However, Filbert, Jr. and Williams, "Runnerless Mold Design", Technical Report 196, E. I du Pont De Nemours & Co., Inc., Wilmington, Del., 1977, under the heading, "Insulated Runner Molds" at page 3 state, "(S)hould the internal runner freeze solid, the runner can be removed quickly (at the parting line), and molding resumed with little lost time."; and Dym, "Injection Molds and Molding", Second Edition, Van Norstrand Reinhold, New York, 1987, states at page 230, "Quick-acting latches and movement of the press are employed to accomplish the removal of (insulated) runners with little delay." (parenthetical text added).

Pye, "Injection Mold Design", Fourth Edition, Longman Scientific & Technical, Harlow, 1989, states at page 502, "This technique (insulated runner molding) is only practicable because thermoplastics have good insulating properties." (parenthetical text added). However, Dym, supra, states at page 230, "It (resin for an insulated runner) should have a low specific heat and a high thermal conductivity so that it can be melted quickly and attain temperature uniformity." (parenthetical text added).

Csaszar, "Runnerless Molding Without Hangups", SPE Journal, February 1972—Vol. 28, page 20, states at page 21, "Except for the relatively large runner diameter, the insulated runner in no way differs from runners in other systems." However, U.S. Pat. No. 5,069,615 to Schad et al. states at column 8, lines 4–12, "By having the (insulated) runner systems cut in the face of the plates (114, 116), the ability to machine smoothly curved runner passages is greatly facilitated. As a result, sharp corners and other undesired runner features founded in hot runner channels which cause the resin to hang up and degrade are eliminated." (parenthetical text added).

Dym, supra, states at page 230, "The insulated runner, although limited to certain materials in application, involves lower mold costs and a minimum need for temperature controls." However, Csaszar, supra, states at page 22, "The probe is heated by a cartridge (point 13). In a runnerless (insulated runner) system where more than one probe is used, each probe has its own heating element. Each heater in turn is individually wired its own variac control, insuring the fine tuning necessary to balance between freeze-off and drooling at the gate. Individual control of heat to each probe is absolutely essential to proper function of a runnerless system." (parenthetical text added).

Dym, supra, states at page 229, "The insulated (runner) manifold also consists of a manifold that is fed by a machine nozzle except that the passages are not heated." (parenthetical text added). However, Filbert, Jr. and Williams, state at page 7, "(A)dditional heat should be provided to the (insulated) runner plates." (parenthetical text added).

U.S. Pat. No. 3,520,026 to Stidham et al. states at column 1, lines 31–32, "The insulated runner mold uses a large diameter runner with no heaters of any type." However, "Plastic Mold Engineering Handbook", Fourth Edition, Edited by DuBois and Pribble, Van Norstrand Reinhold, New York, 1987, states at page 374, "An insulated runner mold is a mold utilizing electrical heating elements in hot tips at the cavity gate points in conjunction with a colder manifold section."

Menges and Mohren, "How to Make Injection Molds", Second Edition, Hanser Publishers, Munich, 1993, state at page 208, "The danger that cold material may be carried along from frozen sections is a disadvantage of insulated-runner molds. If it should happen, it lowers the quality of parts. High quality technical parts should therefore be produced with hot-runner molds"; and Dym, supra, states at page 230, "(T)he hot runner manifold affords greater ability to controlling melt temperature, which is a prerequisite for precision and quality of the parts." However, Filbert, Jr. and Williams, supra, state at page 4, "The (insulated runner) system has been used successfully with the entire Du Pont First Family of Engineering Plastics, which include 'ZYTEL'* nylon resins. 'DELRIN'* acetal resins, glass-reinforced 'ZYTEL', mineral filled 'MINLON'* thermoplastic nylon resin, and 'RYNITE' thermoplastic polyester resins." (parenthetical text added); and U.S. Pat. No. 5,069,615 to Schad et al. states at column 2, lines 37–41, "Insulated runners have been used in the past because they provide superior streamlining of the runners so that there is less degradation of material when compared to the plastic material in the channels of a hot runner manifold."

Menges and Mohren, state at page 207, "The insulated runner (FIG. 208) operates satisfactorily with materials that flow easily and have a broad melt-temperature range such as PE, PS."; and Filbert, Jr. and Williams, supra, state at page 3, under the heading, "Insulated Runner Molds", "These simple low cost molds, shown in FIG. 2, are generally used with styrenes, ABS, and lower melting ionomers, EVA, or polyolefins which have a broad range of processing temperatures." However, U.S. Pat. No. 5,069,615 to Schad et al. states at column 8, lines 8–12, "(H)eat sensitive resins like PVC, nylon, and the like, normally difficult to process in hot runners, can be easily used in this type of (insulated) runner."

In the opinion of some "experts" the insulated runner system has many limitations to its use:

Csaszar, supra, states at page 21, "Runner diameter (point 2) is critical, however: if the width of the (insulated) runner is too narrow, the melt is likely to freeze off and solidify; if it is too wide, considerable clamping pressure will be required to prevent flashing." (second parenthetical text added).

Dym, supra, states at page 230, "To be considered suitable for insulated (runner) manifold, the materials must have a broad range of melt temperature, must not degrade under prolonged heat exposure as is the case with the insulating 'tube', must have 'long flow' properties, and in general must not discolor under these conditions of operation. The material used in this system must have flexibility in setting conditions and allow delays in cycling without thermal degradation. . . . The material (used in the insulated runner system) should also have a high heat-deflection temperature, so that it may set up (cure) in the relatively warm cavity in a short time for economical cycles." (first and second parenthetical text added).

Menges and Mohren, supra, state at page 207, "It is important that the amount of hot material in the (insulated) runner is smaller than the shot weight. Only then will the material in the runner be renewed shot after shot. . . . Before molding begins, (insulated runner) molds should be heated up to about 150° C. Otherwise a start-up of molds especially after a long interruption is not possible. As soon as the thermal balance of the mold has been reached, the heating has to be turned off to allow solidification and demolding of the parts." (parenthetical text added).

Pye, supra, states at page 503, "The (insulated runner) mould needs to be fairly warm when starting up, but to achieve an economic cycle the temperature is then progressively reduced until the required conditions are reached." (parenthetical text added).

Filbert, Jr. and Williams, supra, state at page 4, "(H)eated probes (for insulated runner systems) prevent gate freeze-off and are necessary for crystalline resins that have rapid freezing characteristics." (parenthetical text added).

U.S. Pat. No. 3,021,568 to Scott states at column 2, lines 42–46, "The invention (insulted runner molding) is particularly applicable to materials which can be defined as high density, highly crystalline solid polymers, although low density, low crystallinity polymers can also be employed." (parenthetical text added).

U.S. Pat. No. 3,740,179 to Schmidt states at column 1, lines 37–42, "In these (insulated runner) system, particular care must also be taken to ensure that a relatively thick layer solidifies on the inner wall of the insulated runner during the operation, as a result of which a thicker cross section than normal has to be provided to allow for the passage of the melt." (parenthetical text added).

In the opinion of some "experts" the insulated runner system has many disadvantages to its use:

U.S. Pat. No. 3,520,026 to Stidham et al. states at column 1, lines 36–40, states, "Such (insulated) runner systems . . . suffer from certain disadvantages. For instance, it is difficult to control the temperature accurately and therefore the operation frequently results in the production of drool at the gate or else freezing off at the gate." (parenthetical text added).

U.S. Pat. No. 3,740,179 to Schmidt states at column 1, lines 31–37, "(D)isadvantages are associated with the use of an insulated runner. More particularly a drop in temperature and pressure occurs in the vicinity of the insulated runner. In addition to this, the volume of the charge for the relevant injection-moulding machine must be large enough for the gage system and the mould cavities to be filled with the initial charge."

U.S. Pat. No. 4,072,737 to Wolf states at column 1, lines 22–31, "One particularly attractive system involves the use of an insulated runner, however, the use of a cartridge heater or heated torpedo extending into the gate channel as commonly used in such a system, creates significant lean and distortion problems when reheating molded preforms. This lean causes thermo-formed articles prepared from such preforms to have an undesirable variation in wall thickness and often the minimum acceptable limits will not be satisfied."

U.S. Pat. No. 4,965,028 to Maus et al. states at column 4, line 40 to column 5, lines 11, "Such (insulated runner) systems obviously have as an inherent disadvantage a gross thermal inhomogeneity within this melt delivery system; . . . By definition, the solidified portion is well below the melting-point temperature of that particular polymer, and the central passageway temperature must be sufficiently above that melt-point temperature to provide easy flow with minimal restriction. Therefore, a temperature gradient between these two extremes of 100° F. is quite common and, consequently, as each cycle shot is delivered, sweeping through all variety of partially-solidifying, high-viscosity materials, along with very low-viscosity, high-temperature material, a very inhomogeneous mix of relatively-poor melt quality is the result." (parenthetical text added).

The present thinking in the art regarding utilization of insulated runner systems is expressed by the following statements:

U.S. Pat. No. 5,554,395 to Hume et al, at column 1, lines 47–58, states, "It, therefore, will be understood that the insulated (runner) apparatus is limited to manufacture of thin walled articles (i.e., articles having a small, comparatively fast solidifying volume) in a fast cycling mold. In addition, the length of the various runner channels must be comparatively short in order to avoid 'freeze off' during the low melt pressure interval. Accordingly, such apparatus are limited to use with molds containing a limited number of cavities. In view of these drawbacks, the insulated apparatus is not currently in common use by production molders." (first parenthetical text added).

U.S. Pat. No. 5,551,863 to Hepler, filed in 1994, states at column 2, lines 31–51, "Very few of these (insulated runner molds) are built today because other runnerless molding technologies perform much better than this type. . . . While easy to build, this style of mold was extremely difficult to run, particularly when cycle interruptions occurred. If new material was not frequently introduced into the system, the insulated runner would freeze, and the cull (sprue) would have to be physically removed from the mold. As this was a frequent occurrence, the runner plates were latched together, and the machine clamping pressure was relied on to keep the plates from separating under injection pressure. While successful under some circumstances, like fast cycles and large shots with particular plastics, this type of mold largely is a thing of the past." (parenthetical text added).

Accordingly, the level of ordinary skill in the art of insulated runner injection molding has now declined to an almost unrecognizable low level.

SUMMARY OF THE INVENTION

We have discovered that the primary reason why insulated runner injection molding is seldom used despite being able to overcome the above-described inefficiency problems of hot runner injection molding is the fact that the various steps performed by the system operator during an insulated-runner injection molding method are of such a complex and delicate nature that highly skilled and expensive operators have been required to be present throughout an entire production run in order to perform the operation in a consistently reliable manner.

The present invention automates various aspects of the operation of insulated runner injection molding systems by introducing new responses to various sensing steps or other steps of the operation to thereby reduce the performance requirements of the system operators. By our discovery of the root of the problem that has disfavored the use of insulated runner injection molding methods and systems, which heretofore was unrecognized for many years by most persons skilled in the art, and by our providing the remedy therefor, we have invented an improved insulated runner injection molding method and system that satisfies the long felt need to overcome the above-described inefficiency problems of the hot runner injection molding method and system.

The present invention provides a method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injection molding system includes a machine gate for controlling access to a space between disengaged channel-encasing mold parts, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, closing the machine gate;

(d) in automatic response to a manual operation incident to said closure of the machine gate, adjusting the molding system in order to enable further said steps (a) and (b);

(e) sensing said adjustment of the molding system; and (f) in automatic response to sensing said adjustment of the molding system, metering said predetermined quantity of molten plastic material for injection during a further said step (a).

Preferably, the manual operation that is incident to said closure of the machine gate is initiated before the mold-cavity-encasing mold parts are completely closed.

In some preferred embodiments, the step that is in automatic response to a manual operation that is incident to closing the machine gate is not in response to any other manual operation that is initiated subsequent to said incident operation.

A given step is in automatic response to another step when the other step causes the given step even though (a) the causal relationship is not immediate, and (b) a third step is also required to cause the given step. For example, in one scenario in which step A is caused by step B, which is caused by step C, which is caused by step D: step A is in automatic response to step B, step A is in automatic response to step C, and step A is in automatic response to step D. In another exemplary scenario in which step A is caused by any combination of step B and step C, step A is in automatic response to step B, and step A is in automatic response to step C.

The present invention also provides a method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, re-engaging the channel-encasing mold parts;

(d) sensing said re-engagement of the channel-encasing mold parts;

(e) in automatic response to sensing said re-engagement of the channel-encasing mold parts, adjusting the molding system in order to enable further said steps (a) and (b);

(f) sensing said adjustment of the molding system; and (g) in automatic response to sensing said adjustment of the molding system, metering said predetermined quantity of molten plastic material for injection during a further said step (a).

In some preferred embodiments, the step that is in automatic response to a sensing step is not in response to any manual operation that is initiated subsequent to the sensing step.

Additional features of the present invention are described with reference to the detailed description of the preferred embodiments.

BRIEF DESCRIPTION OF THE DRAWING

FIG. 1 is a diagram of a preferred embodiment of an insulated runner injection molding system that is operated in accordance with the present invention. This diagram shows the system prior to injection of plastic material to form the insulated runner.

FIG. 2 is a diagram of the system of FIG. 1 showing injection of plastic material to form an insulated runner in accordance with one aspect of the present invention.

FIG. 2A is a diagram of the system of FIG. 1 showing two examples of undesired injection of plastic material to form an insulated runner that are avoided by injecting plastic material to form the insulated runner in the manner shown in FIG. 2.

FIG. 3 is a diagram of the system of FIG. 1 showing injection of plastic material through the insulated runner and into the mold cavities to form plastic products in accordance with a preferred embodiment of the present invention.

FIG. 5 is a diagram of the system of FIG. 1 showing automated cleaning of debris from disengaged mold-cavity-encasing mold parts subsequent to an end-of-sequence signal in accordance with a further aspect of the present invention, wherein the machine gate is closed.

FIG. 6 is a diagram showing the system of FIG. 1 subsequent to the automated cleaning of debris from disengaged mold-cavity-encasing mold parts shown in FIG. 5, wherein the machine gate has been opened.

FIG. 7 is a diagram of the system of FIG. 1 showing adjustments of the molding system to enable disengagement of the channel-encasing mold parts.

DETAILED DESCRIPTION

Figure 4:
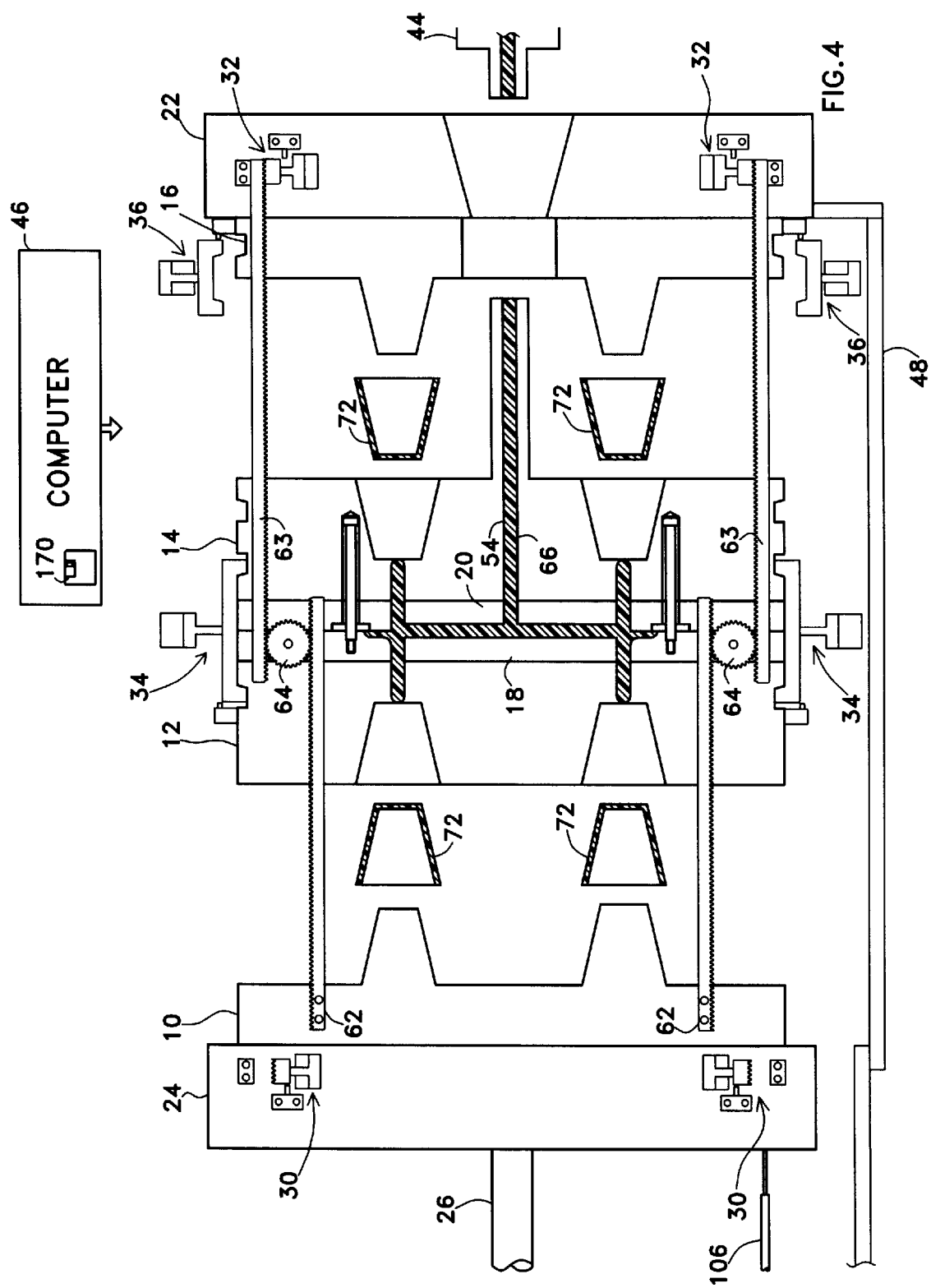
FIG. 4 is a diagram of the system of FIG. 1 showing ejection of plastic products from disengaged mold-cavity-encasing mold parts.

Referring to FIGS. 1 through 9, a preferred embodiment of an insulated runner injection molding system according to the present invention for performing the methods of the different aspects of the present invention includes a first pair of separable mold-cavity-encasing mold parts 10, 12, a second pair of separable mold-cavity-encasing mold parts 14, 16, a pair of separable channel-encasing mold parts 18, 20 located between the first pair of separable mold-cavity-encasing mold parts 10, 12 and the second pair of separable mold-cavity-encasing mold parts 14, 16, a stationary platen 22 attached to one of the second pair of separable mold-cavity-encasing mold parts 16, a movable platen 24 attached to one of the first pair of separable mold-cavity-encasing mold parts 10, a hydraulic positioning mechanism 26 attached to and between the movable platen 24 and a stationary element (not shown), a set of rack and pinion systems 28, a first set of hydraulic rack-fastening mechanisms 30 mounted on the movable platen 24, a second set of hydraulic rack-fastening mechanisms 32 mounted on the stationary platen 22, a first set of hydraulic mold-latching mechanisms 34, a second set of hydraulic mold-latching mechanisms 36, a set of bolts 38 attached to one of the channel mold parts 18, a set of washers 40 that are movable on the bolts 38 between the one channel mold part 18 and bolt heads 42 at the free ends of the respective bolts 38, an injection unit 44, a computer 46, and a machine gate 48. During normal operations the mold-cavity-encasing mold part 12 is attached to one of the channel-encasing mold parts 18 and the mold-cavity-encasing mold part 14 is attached to other of the channel-encasing mold parts 20. The injection molding system shown in FIGS. 1 through 9 is a stack molding system. Although only two of each of the various sets of components described herein are shown in the Drawing, it should be understood that the views of the Drawing show only one side of a preferred embodiment of the molding system and that the embodiment of the molding system described with reference to the Drawing may include sets including more than two of each of the various components.

The computer 46 controls the automatic operations of the hydraulic positioning mechanism 26, the first set of hydraulic rack-fastening mechanisms 30, the second set of hydraulic rack-fastening mechanisms 32, the first set of hydraulic mold-latching mechanisms 34, the second set of hydraulic mold-latching mechanisms 36, and the injection unit 44, and also controls automatic opening of the machine gate 48.

Referring to FIG. 1, the first pair of mold-cavity-encasing mold parts 10, 12 encase a first plurality of mold cavities 50, and the second pair of mold-cavity-encasing mold parts 14, 16 encase a second plurality of mold cavities 52. The channel-encasing mold parts 18, 20 encase a channel 54. The channel 54 includes a plurality of branches 55 culminating in gates 56 leading to the first and second pluralities of mold cavities 50, 52, and a set of extensions 57 that respectively overlap the set of washers 40 when the channel-encasing mold parts 18, 20 are engaged. Each of the bolts 38 extends through a hole 58 in the other channel-encasing mold part 20 into a pocket 60 in the other of the second pair of mold-cavity-encasing mold parts 14. The set of extensions 57 also includes extensions (not shown) in a direction normal to the plane of FIGS. 1–9 at one or more of the junctions of the branches of the channel 54; and bolts, washers, holes and pockets (not shown), such as the bolts 38, washers 40, holes 58 and pockets 60, are disposed adjacent to such normal extensions. The bolts, washers, holes and pockets that are disposed adjacent to such normal extensions extend within the plane of FIGS. 1–9 in the same manner as the bolts 38, washers 40, holes 58 and pockets 60 shown in FIGS. 1–9. In other embodiments still more combinations of channel extensions, bolts, washers, holes and pockets may be provided.

Each of the rack and pinion systems 28 includes a first rack 62, a second rack 63 and a passive pinion gear 64 disposed between the first rack 62 and the second rack 63. The first rack 62 is attached to the one of the first pair of mold parts 10 that is attached to the movable platen 24; and the second rack 63 is attached to either the stationary platen 22 or the movable platen 24 in accordance with the respective different dispositions of the first set of hydraulic rack-fastening mechanisms 30 and the second set of hydraulic rack-fastening mechanisms 32, as shown in FIGS. 1 and 7. In an alternative embodiment, each of the second racks 63 is attached to either the channel-encasing mold part 20 by a respective second rack-fastening mechanism 32 or the mold-cavity-encasing mold part 10 by a respective first rack-fastening mechanism 30, instead of to the stationary platen 22 and the movable platen 24, respectively.

As the movable platen 24 is being repositioned by the hydraulic positioning mechanism 26, the rack and pinion systems 28 passively vary the relative positions of the mold-cavity-encasing mold parts 10, 12, 14, 16 and the channel-encasing mold parts 18, 20 in accordance with the respective dispositions of the first and second sets of hydraulic rack-fastening mechanisms 30, 32 and the first and second sets of hydraulic mold-latching mechanisms 34, 36.

Prior to the beginning of a molding sequence that includes a plurality of injection molding cycles, the molding system is adjusted in the following manner. The first set of hydraulic rack-fastening mechanisms 30 and the second set of hydraulic rack-fastening mechanisms 32 are operated to attach each of the second racks 63 to only the stationary platen 22; the first set of hydraulic mold-latching mechanisms 34 are operated to latch the other of the first pair of mold-cavity-encasing mold parts 12 to the other of the second pair of mold-cavity-encasing mold parts 14 to thereby prevent the separable channel-encasing mold parts 18, 20 from separating from one another; and the second set of hydraulic mold-latching mechanisms 36 are operated to unlatch the second pair of mold-cavity-encasing mold parts 14, 16 from each other, as shown in FIG. 1, so that only the respective first and second pairs of mold-cavity-encasing mold parts 10, 12; 14, 16 are disengaged when the movable platen 24 is moved to the left by the hydraulic positioning mechanism 26, as shown in FIG. 4.

Referring to FIG. 2, at the beginning of the molding sequence the injection unit 44 is moved into engagement with the channel 54 and a predetermined quantity of molten plastic material is initially injected into the channel 54 from the injection unit 44 to form an insulated runner 66 in the channel 54. The insulated runner 66 is formed with a solidified insulating plastic shell and a molten plastic core for conducting further injected molten plastic material toward the mold cavities 50, 52. Commencement of injection of further molten plastic material during the plurality of injection molding cycles is delayed for a predetermined period after conclusion of the initial injection of the predetermined quantity of molten plastic material in order to allow sufficient time for the formation of the insulated runner 66. Typically this predetermined period of delay is on the order of between thirty and sixty seconds.

The predetermined quantity of molten plastic material that is initially injected into the channel 54 is metered under control of the computer 46 so that the insulated runner 66 formed by such injection covers the mold-part-separation lines between the other of the first pair of mold-cavity encasing mold parts 12 and the one of the channel-encasing mold parts 18 and the mold-part-separation lines between the other of the second pair of mold-cavity encasing mold parts 14 and the other of the channel-encasing mold parts 20, and so that the insulated runner 66 formed by such injection does not extend to any of the gates 56. The quantity of molten plastic material that is initially injected respectively into the different branches 55 of the channel 54 is controlled by separately controlling the quantity of air that escapes from the different branches 55 during such injection. The quantity of air that escapes from the different branches 55 during such injection is controlled by separately controlling the quantity of air that is vented from the respective mold cavities 50, 52. It is known in the art to vary the amount of air that is vented from a mold cavity during the filling of a mold cavity in order to completely fill the mold cavity.

When the insulated runner 66 formed by the initial injection does not cover the mold-part-separation lines between the other of the first pair of mold-cavity encasing mold parts 14 and the other of the channel-encasing mold parts 20, as shown at 68 in FIG. 2A, molten plastic material injected at a higher injection pressure during the plurality of injection molding cycles of the injection molding sequence may accidentally squirt between the surfaces of the mold-cavity encasing mold part 14 and the channel-encasing mold part 20 that face each other at such mold-part-separation line.

When the insulated runner 66 formed by the initial injection extends to any of the gates 56, as shown at 70 in FIG. 2A, the injected plastic sometimes freezes at one or more of such gates 56 during the predetermined period of delay required for formation of the insulated runner 66 to thereby block injection of further molten plastic through the gate during the plurality of injection molding cycles of the injection molding sequence.

Referring to FIG. 3, after the predetermined period of delay subsequent to conclusion of the initial injection of the predetermined quantity of molten plastic material to form the insulated runner, injection of further molten plastic material during the plurality of injection molding cycles commences. During each cycle, further molten plastic material is injected through the insulated runner 66 and the gates 56 into the mold cavities in accordance with parameters of the plurality of injection molding cycles to form plastic products 72 in the mold cavities 50, 52 upon cooling of the injected plastic material.

Referring to FIG. 4, after a predetermined product cooling period subsequent to completion of the further injection of plastic material during each cycle, during which the plastic products 72 are solidified in the mold cavities 50, 52, the injection unit 44 is disengaged from the channel 54, as the hydraulic positioning system moves the movable platen 24 to the left to disengage the first pair of mold-cavity-encasing mold parts 10, 12 and to disengage the second pair of mold-cavity-encasing mold parts 14, 16; and the plastic products 72 are ejected from the disengaged mold-cavity-encasing mold parts by ejection apparatus (not shown) known in the art.

Figure 10:
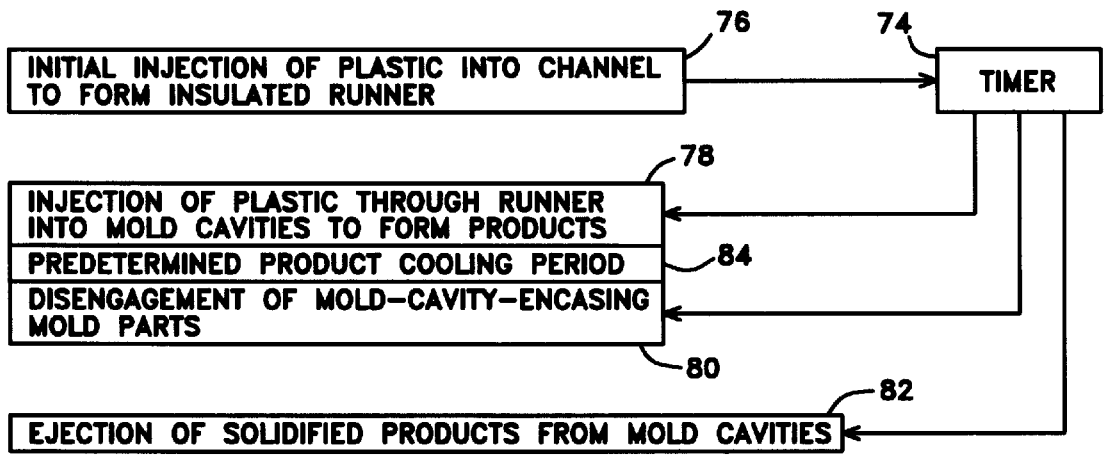
FIG. 10 is a flow diagram illustrating the timing of the injection of plastic material into the channel and subsequently into the mold cavities in accordance with the aspects of the present invention shown in FIGS. 1, 2 and 3.

Referring to FIG. 10, a timer 74 implemented in the computer 46 is set by completion of (76) the initial injection of molten plastic material into the channel 54 to form the insulated runner 66. At predetermined times during each of the plurality of injection molding cycles after completion of (76) the initial injection of molten plastic material into the channel 54 to form the insulated runner 66, as indicated by the timer 74, the computer 46 causes (78) the injection of molten plastic material through the insulated runner 66 into the mold cavities 50, 52 for a predetermined interval to form the plastic products; (80) disengagement of the mold-cavity-encasing mold parts 10, 12, 14, 16; and (82) ejection of the solidified plastic products 72 from the mold cavities 50, 52, as shown in FIG. 4. The predetermined product cooling period during each of the respective injection molding cycles is the period 84 between the end of (78) the injection of molten plastic material through the insulated runner 66 into the mold cavities 50, 52 and the beginning of (80) the disengagement of the mold-cavity-encasing mold parts 10, 12, 14, 16.

Figure 4A:
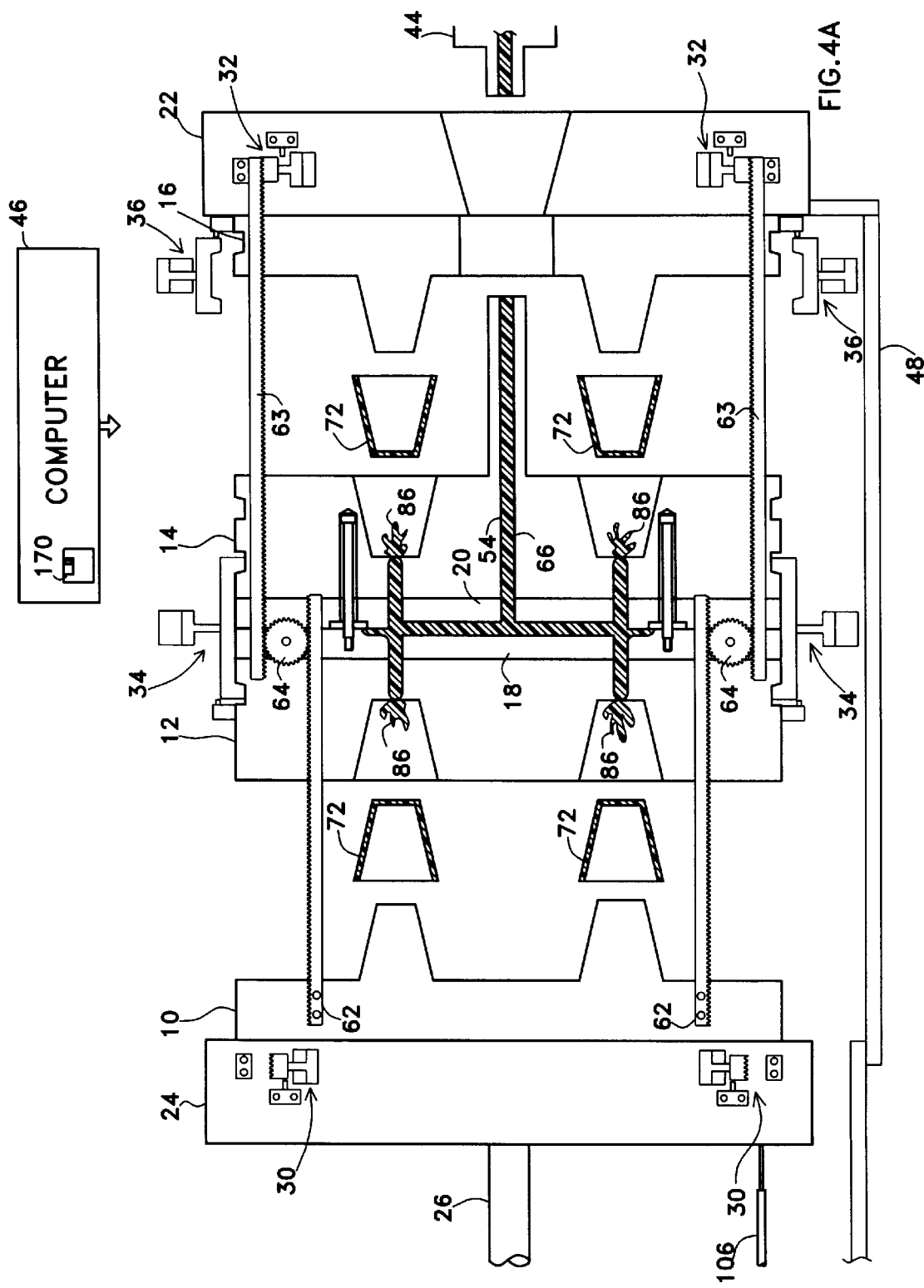
FIG. 4A is a diagram of the system of FIG. 1 showing undesired drooling of plastic material into disengaged mold-cavity-encasing mold parts upon ejection of plastic products therefrom when the plastic material has not been injected into the mold cavities in accordance with another aspect of the present invention.

The computer 46 controls the timing of the predetermined product cooling period 84 during each of the respective cycles in order to significantly reduce drooling of injected molten plastic material into the mold cavities 50, 52 upon ejection of the plastic products 72, such as shown at 86 in FIG. 4A, during the first several of the plurality of injection molding cycles. Such drooling occurs upon ejection of the plastic products 72 during the first several of the plurality of injection molding cycles because during the first several of the plurality of injection molding cycles there is more molten plastic material in the insulated runner 66 while the insulated runner 66 is still very young, and further because the molten plastic material is injected at a much higher pressure during the plurality of injection molding cycles than during the initial injection of molten plastic material into the channel 54 to form the insulated runner 66. As the insulated runner 66 matures the amount of molten plastic material in the insulated runner 66 decreases so that eventually the predetermined product cooling period required to solidify the plastic products 72 in the mold cavities 50, 52 is sufficient to temporarily maintain the molten plastic material in the insulated runner 66 at the gates 56 at a viscosity that is adequate to prevent any significant drooling of injected molten plastic material into the mold cavities 50, 52 during ejection of the plastic products 72. The pressure of the next injection of plastic material forces the molten plastic material in the insulated runner 66 through the gates 56 and into the mold cavities 50, 52.

The first occurring predetermined product cooling period during the plurality of injection molding cycles is controlled by the computer 46 to be of a longer duration than the later predetermined product cooling period that is required to solidify the plastic products 72 in the mold cavities 50, 52 to thereby at least significantly reduce drooling of the further injected molten plastic material into the mold cavities 50, 52 upon ejection of the plastic products 72, as compared to such drooling as would occur if the first occurring predetermined product cooling period were not of longer duration than the later predetermined product cooling period. The computer reduces the predetermined product cooling periods as the insulated runner 66 matures, such that a product cooling period subsequent to the first occurring predetermined product cooling period and prior to the later predetermined product cooling period is of shorter duration than the first occurring predetermined product cooling period and of longer duration than the later predetermined product cooling period. In most preferred embodiments, the initial predetermined cooling period required for formation of the insulated runner 66 is of longer duration than any of the predetermined product cooling periods during the plurality of injection molding cycles.

When the plurality of injection molding cycles commences, there are air pockets in the channel 54 before the gates 56 to the respective mold cavities 50, 52. Accordingly, during the first one of the plurality of injection molding cycles more molten plastic material is injected from the injection unit 44 than is required to fill the mold cavities 50, 52 in order to compensate for and eliminate such air pockets. During the subsequent cycles only the quantity of molten plastic material that is required to fill the mold cavities 50, 52 is injected from the injection unit 44. In an alternative embodiment, only the quantity of molten plastic material that is required to fill the mold cavities 50, 52 is injected from the injection unit 44 during each of the plurality of injection molding cycles, and the initially injected products that are incomplete because of the filling of such air pockets are discarded.

After a number of the injection molding cycles, an interruption in the molding sequence can cause the insulated runner 66 to fully solidify to form a sprue 66', as shown in FIGS. 5 through 9. Upon occurrence of such full solidification of the insulated runner 66 to form the sprue 66' the injection unit 44 can no longer inject molten plastic into the channel 54 and thereby automatically ceases operation, whereupon an alarm is provided to alert an operator of the injection molding system of such occurrence, and an end-of-sequence signal is provided.

Figure 11:
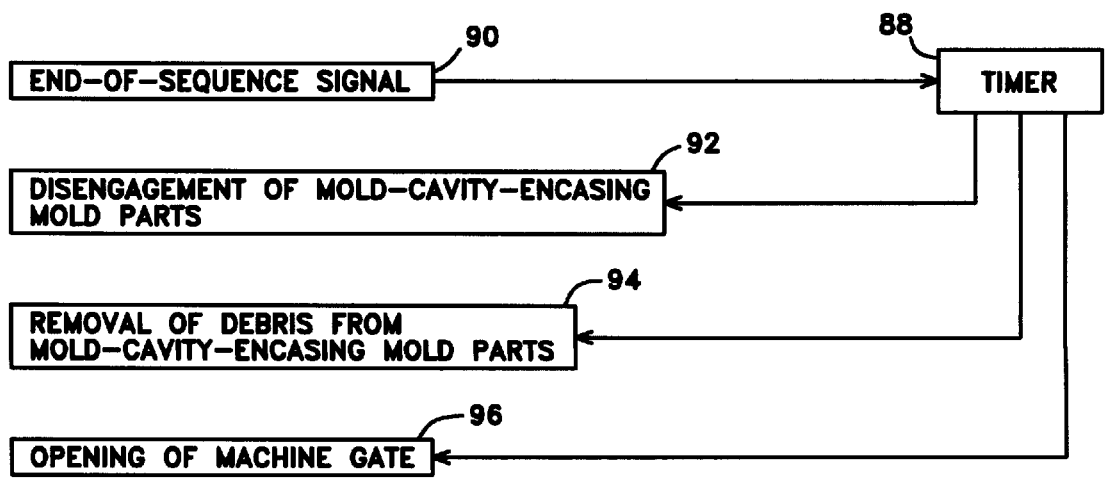
FIG. 11 is a flow diagram illustrating automatic responses of various operations of the insulated runner injection molding system shown in FIGS. 5 and 6 that occur in response to an end-of-sequence signal in accordance with a preferred embodiment of the present invention.

Referring to FIG. 11, a timer 88 implemented in the computer 46 is set by the end-of-sequence signal 90. In automatic response to the end-of-sequence signal 90 at predetermined times after the end-of-sequence signal 90, as indicated by the timer 88, the computer sequentially causes (92) disengagement of the mold-cavity-encasing mold parts 10, 12, 14, 16, as shown in FIG. 5, to enable removal of debris from the disengaged mold-cavity-encasing mold parts 10, 12, 14, 16; (94) removal of debris from the disengaged mold-cavity-encasing mold parts 10, 12, 14, 16, as also shown in FIG. 5; and (96) the opening of the machine gate 48, as shown in FIG. 6, to enable the operator to inspect the disengaged mold-cavity-encasing mold parts 10, 12, 14, 16.

The predetermined time after the end-of-sequence signal 90 at which the disengagement operation 92 is initiated by the computer 46 allows for further cooling of the sprue 66'. The predetermined time after the end-of-sequence signal 90 at which the removal operation 94 is initiated by the computer 46 allows for further cooling of the sprue 66' and the time required to complete the disengagement operation 92. The predetermined time after the end-of-sequence signal 90 at which the opening operation 96 is initiated by the computer 46 allows for further cooling of the sprue 66', the time required to complete the disengagement operation 92, and the time required to complete the removal operation 94.

In the preferred embodiment, none of (92) the disengagement of the mold-cavity-encasing mold parts 10, 12, 14, 16 to enable removal of debris from the disengaged mold-cavity-encasing mold parts 10, 12, 14, 16; (94) the removal of debris from the disengaged mold-cavity-encasing mold parts 10, 12, 14, 16; and (96) the opening of the machine gate 48 to enable the operator to inspect the disengaged mold-cavity-encasing mold parts 10, 12, 14, 16 is in response to any manual operation that occurs subsequent to the end-of-sequence signal 90. In other embodiments one or more of such operations (92), (94), (96) is in response to a manual operation that occurs subsequent to the end-of-sequence signal 90.

Referring to FIG. 5, debris is removed from the mold cavities 50, 52 by compressed air imparted from air jets 98 mounted on the mold-cavity-encasing mold parts 10, 12, 14, 16. At any one time, compressed air is imparted from only the air jets 98 mounted on one of a given pair of mold-cavity-encasing mold parts 10, 12, 14, 16. For example, compressed air is first imparted from only the air jets 98 mounted on one of each pair of the mold-cavity-encasing mold parts 10, 14; and then compressed air is imparted from only the air jets 98 mounted on the opposing one of each pair of mold-cavity-encasing mold parts 12, 16. Such air imparting steps may be repeated a number of times. The operation of the air jets 98 to remove debris from the mold-cavity-encasing mold parts 10, 12, 14, 16 is controlled by the computer 46 as described above with reference to FIG. 11.

Figure 12:
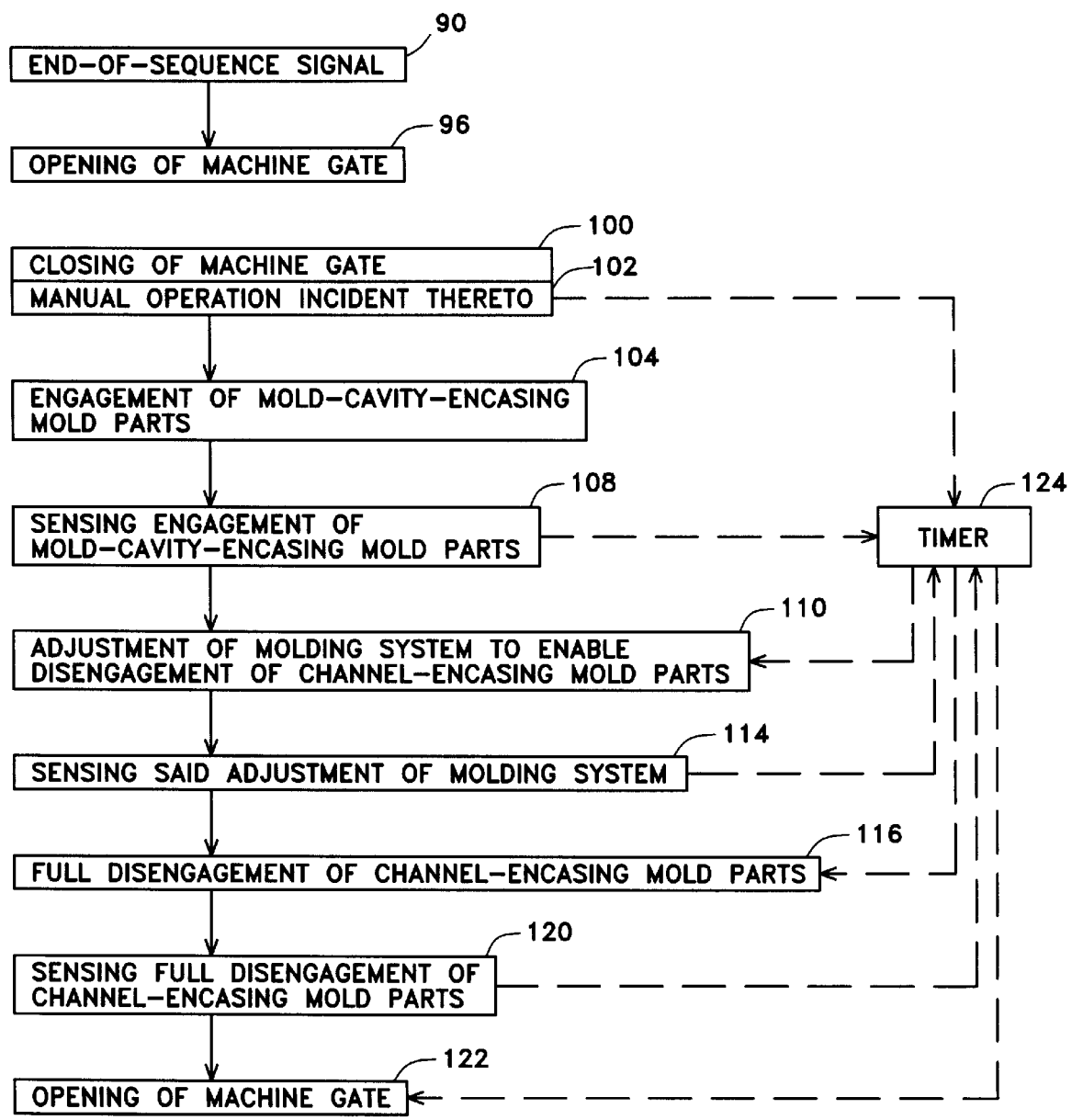
FIG. 12 is a flow diagram showing alternative embodiments of automatic responses of various operations of the insulated runner injection molding systems shown in FIGS. 5 through 9 that occur subsequent to an end-of-sequence signal.

Referring to FIG. 12, after having inspected the disengaged mold-cavity-encasing mold parts 10, 12, 14, 16 following (96) the opening of the machine gate 48 subsequent to the end-of-sequence signal 90, the operator causes (100) the closing of the machine gate 48 while the mold-cavity-encasing mold parts 10, 12, 14, 16 are disengaged. In automatic response to (102) a manual operation by the operator incident to (100) the closing of the machine gate 48 while the mold-cavity-encasing mold parts 10, 12, 14, 16 are disengaged, the computer 46 causes (104) engagement of the mold-cavity-encasing mold parts 10, 12, 14, 16, as shown in FIG. 7. A manual operation by the operator incident to the closing of the machine gate 48 may be (a) a manual closing of the machine gate, (b) a manual operation of a control button, a switch or the like that causes the machine gate 48 to be closed, or (c) a manual operation of a control button, a switch or the like incident in time to closure of the machine gate 48.

A linear position sensor 106 coupled to the computer 46 is disposed to sense the linear position of the movable platen 24, and thereby senses (104) the engagement of the mold-cavity-encasing mold parts 10, 12, 14, 16. In automatic response to (108) sensing the engagement of the mold-cavity-encasing mold parts by the linear position sensor 106, and at a predetermined time thereafter, the computer 46 causes (110) adjustment of the molding system as shown in FIG. 7 to enable disengagement of the channel-encasing mold parts 18, 20.

Figure 8:
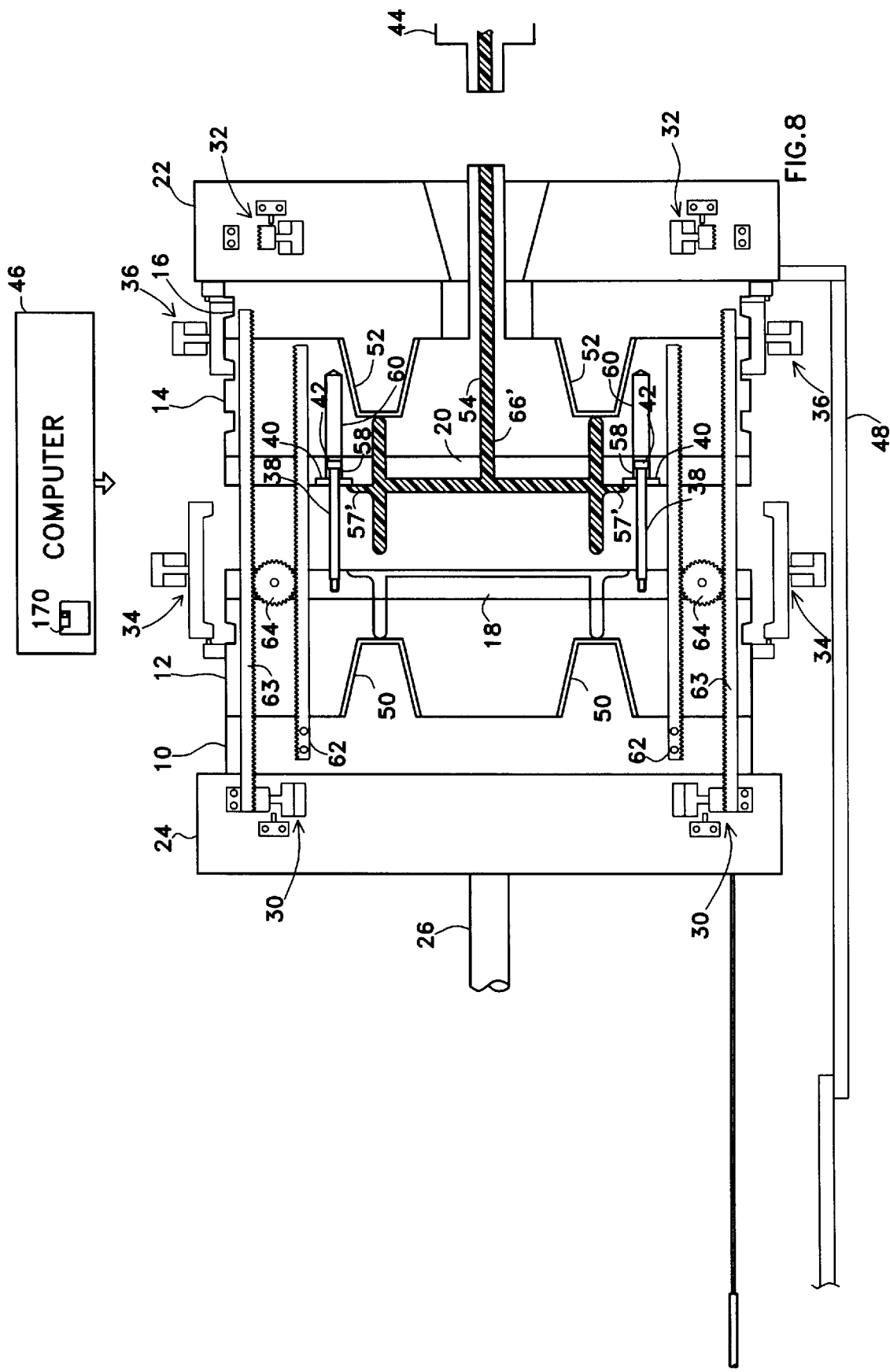
FIG. 8 is a diagram of the system of FIG. 1 showing a first stage of disengagement of the channel-encasing mold parts.

Referring to FIG. 7, the computer 46 operates the first set of hydraulic rack-fastening mechanisms 30 to remotely fasten each of the racks 63 to the movable platen 24 and operates the second set of hydraulic rack-fastening mechanisms 32 to remotely unfasten each of the racks 63 from the stationary platen 22, to thereby attach each of the second racks 63 to only the movable platen 24; the computer 46 operates the first set of hydraulic mold-latching mechanisms 34 to unlatch the other of the first pair of mold-cavity-encasing mold parts 12 from the other of the second pair of mold-cavity-encasing mold parts 14 to thereby enable separation of the channel-encasing mold parts 18, 20; and; the computer 46 operates the second set of hydraulic mold-latching mechanisms 36 to latch the second pair of mold-cavity-encasing mold parts 14, 16 to one another, so that only the channel-encasing mold parts 18, 20 are disengaged when the movable platen 24 is moved to the left by the hydraulic positioning mechanism 26, as shown in FIG. 8.

In an alternative embodiment, the computer 46 causes the adjustment 110 that enables disengagement of the channel-encasing mold parts 18, 20 to be initiated before the engagement 104 of the mold-cavity-encasing mold parts 10, 12, 14, 16 has been completed. The adjustment 110 can be initiated as soon as (92) the disengagement of the mold-cavity-encasing mold parts 10, 12, 14, 16 has been completed, and before (94) the removal of debris from the disengaged mold-cavity-encasing mold parts 10, 12, 14, 16 and (96) the opening of the machine gate 48 to enable the operator to inspect the disengaged mold-cavity-encasing mold parts 10, 12, 14, 16, as described with reference to FIG. 11, and thereby well before (100) the closing of the machine gate 48 subsequent to the end-of-sequence signal 90, as described with reference to FIG. 12, in which case the aforementioned adjustment 110 should not be considered as being in automatic response to any manual operation incident to (100) closing of the machine gate 48.

Detectors 112 coupled to the computer 46 are disposed to sense the respective positions of the first and second sets of hydraulic rack-fastening mechanisms 30, 32 and the first and second sets of hydraulic mold-latching mechanisms 34, 36, and thereby sense (110) the adjustment of the molding system as shown in FIG. 7 to enable disengagement of the channel-encasing mold parts 18, 20. In automatic response to (114) sensing said adjustment of the molding system by the detectors 112, and at a predetermined time thereafter, the computer 46 causes (116) the disengagement of the channel-encasing mold parts 18, 20 as shown in FIGS. 8 and 9.

Referring to FIG. 8, during a first stage of the disengagement of the channel-encasing mold parts 18, 20, since the majority portion of the sprue 66' is within and adhered to the portion of the channel 54 that is within the right-hand channel-encasing mold part 20, the engaged second pair of mold-cavity-encasing mold parts 14, 16 and the stationary platen 22, such adhesion of the majority portion of the sprue 66' causes the remainder of the sprue 66' to be removed from the portion of the channel 54 that is within the left-hand channel-encasing mold part 18. As the remainder of the sprue 66' is being removed from the portion of the channel 54 that is within the left-hand channel-encasing mold part 18 a set of nibs 57' on opposite sides of the sprue 66' that are formed in the extensions 57 of the channel 54 move the washers 40 along the bolts 38 until stopped by the respective bolt heads 42. During further disengagement of the channel-encasing mold parts 18, 20, as shown in FIG. 9, the washers 40 press against the nibs 57' and thereby cause the sprue 66' to be removed from the portion of the channel 54 within the right-hand channel-encasing mold part 20. The set of nibs 57' includes nibs (not shown) formed in the above-described extensions (not shown) that are normal to the plane of FIGS. 1–9 at one or more of the junctions of the branches of the channel 54; and such nibs (not shown) cooperate with the bolts and washers (not shown) that are disposed adjacent thereto in the removal of the sprue 66' from the channel 54 within the right-hand channel-encasing mold part 20. Accordingly, it is seen that the sprue 66' is automatically removed from the channel 54 in sole response to relative movement of the channel-encasing mold parts 18, 20 as the channel-encasing mold parts 18, 20 are being disengaged.

Figure 9:
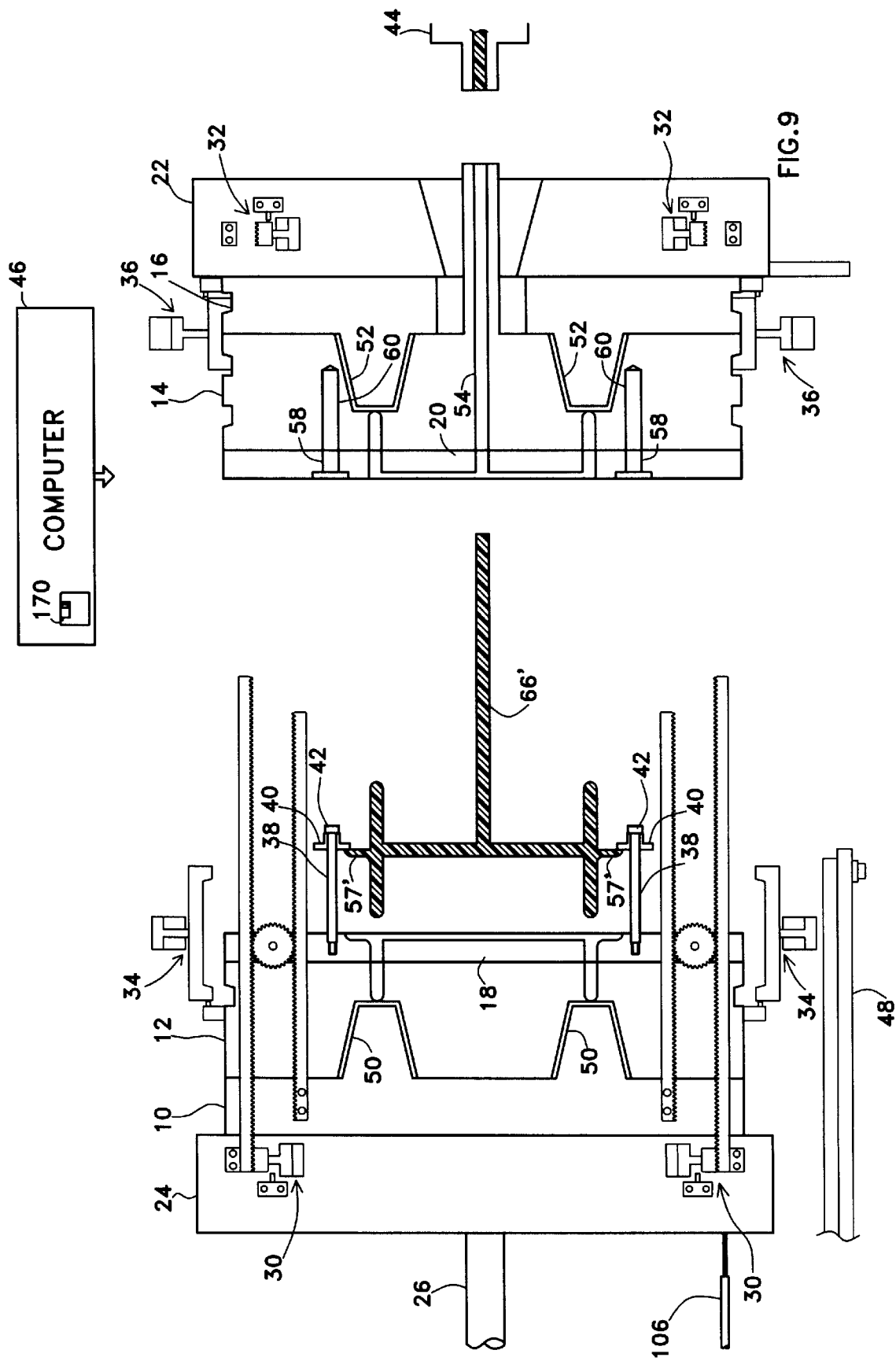
FIG. 9 is a diagram of the system of FIG. 1 showing a further stage of disengagement of the channel-encasing mold parts from that shown in FIG. 8, wherein the insulated runner sprue has been removed from the channel in sole response to relative movement of the channel-encasing mold parts as the channel-encasing mold parts were being disengaged.

In alternative embodiments, hydraulic and/or pneumatic mechanisms are used to remove the sprue 66' from the channel 54 either in lieu of or in addition to the washers 40 and nibs 57' combination shown in FIGS. 8 and 9.

The linear position sensor 106 senses (116) the full disengagement of the channel-encasing mold parts 18, 20 as shown in FIG. 9. In automatic response to (120) sensing said full disengagement of the channel-encasing mold parts 18, 20 by the linear position sensor 106, and at a predetermined time thereafter, the computer 46 causes (122) the opening of the machine gate 48, as shown in FIG. 9 to thereby enable inspection of the disengaged channel-encasing mold parts 18, 20 by the operator.

A timer 124 (shown by dashed lines in FIG. 12) implemented in the computer 46 is utilized in various alternative embodiments of the method shown by the solid lines of FIG. 12 in lieu of one or more of the detectors 106, 112. In one such alternative embodiment, as shown by the dashed lines of FIG. 12, the timer 124 is set by (102) the manual operation by the operator incident to the closing of the machine gate 48. In other such alternative embodiments, the timer 124 is set by (108) sensing engagement of the mold-cavity-encasing mold parts 10, 12, 14, 16; (114) sensing adjustment of the molding system to enable disengagement of the channel-encasing mold parts 18, 20; and/or (120) sensing full disengagement of the channel encasing mold parts 18, 20 to control the timing of one or more of the respectively subsequent adjustment operation 110, the full disengagement operation 116, and the opening of the machine gate 122.

In automatic response to (102) the manual operation by the operator incident to the closing of the machine gate 48, at predetermined times after (102) such manual operation by the operator, as indicated by the timer 124, the computer 46 sequentially causes (110) the adjustment of the molding system as shown in FIG. 7 to enable disengagement of the channel-encasing mold parts 18, 20; (116) the disengagement of the channel-encasing mold parts 18, 20 as shown in FIGS. 8 and 9; and (122) the opening of the machine gate 48 to enable an operator to inspect the disengaged channel-encasing mold parts 18, 20, as shown in FIG. 9.

The predetermined time after (102) the manual operation by the operator incident to the closing of the machine gate 48 at which the adjustment operation 110 is initiated by the computer 46 allows for the time required to complete the engagement operation 104. The predetermined time after such manual operation 102 at which the disengagement operation 116 is initiated by the computer 46 allows for the time required to complete the engagement operation 104 and the time required to complete the adjustment operation 110. The predetermined time after such manual operation 102 at which the opening operation 122 is initiated by the computer 46 allows for the time required to complete the engagement operation 104, the time required to complete the adjustment operation 110, and the time required to complete the disengagement operation 116.

In other alternative embodiments, less than all of (110) the adjustment of the molding system; (116) the disengagement of the channel-encasing mold parts 18, 20; and (122) the opening of the machine gate 48 are in automatic response to a sensing operation as shown by the solid lines of FIG. 12, and the remainder thereof occur(s) at a predetermined time as measured by the timer 124, as shown by the dashed lines of FIG. 12.

In one alternative embodiment, the timer 124 provides a timing signal to the computer 46 that causes the computer 46 to cause the adjustment operation 110 to be initiated before the mold-cavity-encasing mold parts 10, 12, 14, 16 are completely closed to complete the engagement 104 of the mold-cavity-encasing mold parts. 10, 12, 14, 16.

In the preferred embodiment, none of (110) the adjustment of the molding system to enable disengagement of the channel-encasing mold parts 18, 20; (116) the disengagement of the channel-encasing mold parts 18, 20; and (122) the opening of the machine gate 48 to enable an operator to inspect the disengaged channel-encasing mold parts 18, 20 is in response to any manual operation that occurs subsequent to (102) the manual operation by the operator incident to the closing of the machine gate 48. In other embodiments one or more of such operations (110), (116), (122) is in response to a manual operation that occurs subsequent to (102) the manual operation by the operator incident to the closing of the machine gate 48 while the mold-cavity-encasing mold parts 10, 12, 14, 16 are engaged.

Figure 13:
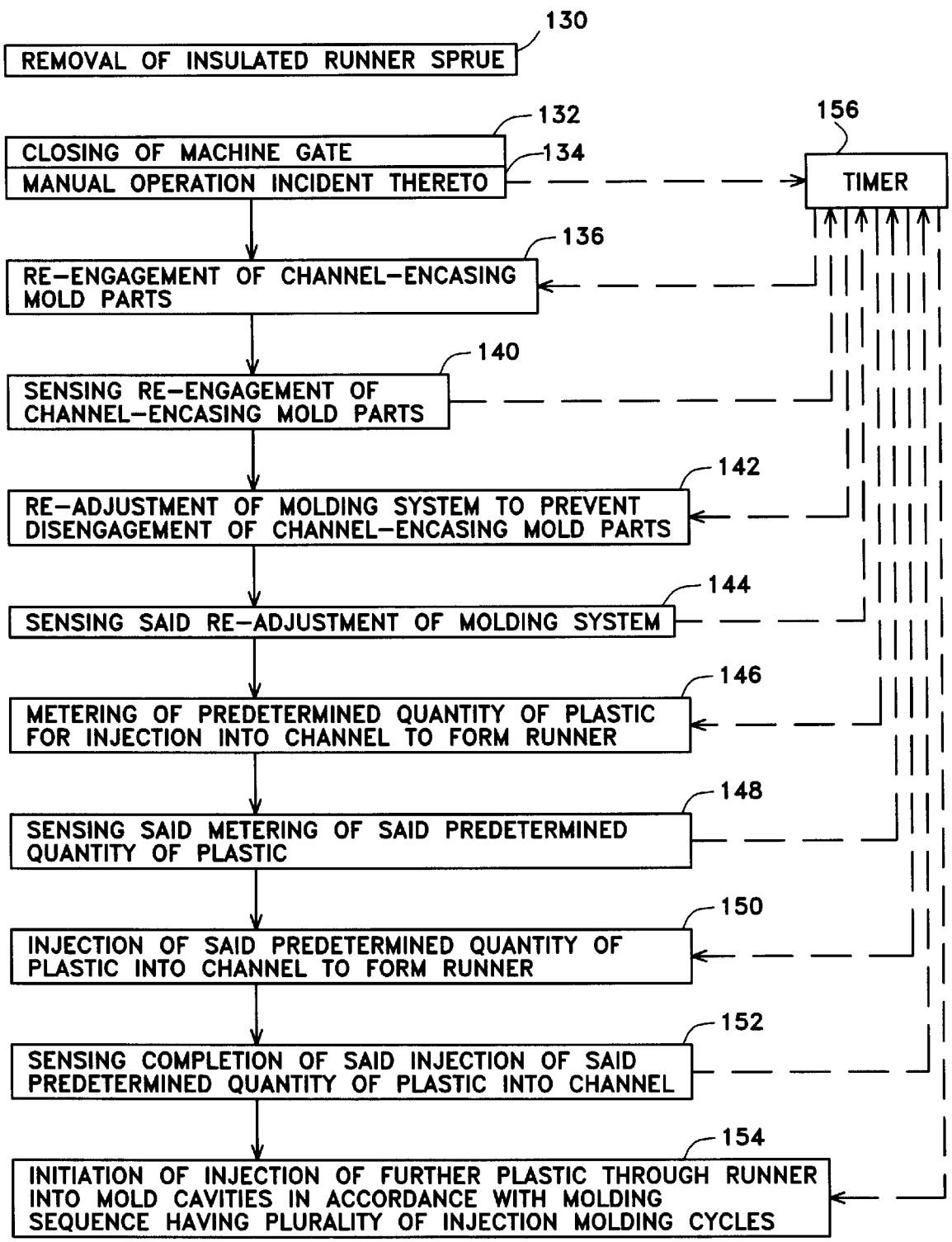
FIG. 13 is a flow diagram showing alternative embodiments of automatic responses of various operations of the insulated runner injection molding system shown in FIGS. 1, 2 and 3 that occur subsequent to removal of the sprue.

Referring to FIG. 13, subsequent to (130) removal of the insulated runner sprue 66' from the molding system and inspection of the disengaged cavity-encasing mold-parts 18, 20, the operator causes (132) the closing of the machine gate 48 while the channel-encasing mold parts 18, 20 are disengaged. In automatic response to (134) a manual operation by the operator incident to (132) the closing of the machine gate 48 while the channel-encasing mold parts 18, 20 are disengaged, the computer 46 causes (136) re-engagement of the channel-encasing mold parts 18, 20, as shown in FIG. 7 but without the sprue 66' in the channel 54.

The linear position sensor 106 senses (136) the re-engagement of the channel-encasing mold parts 18, 20. In automatic response to (140) sensing the re-engagement of the channel-encasing mold parts 18, 20 by the linear position sensor 106, and at a predetermined time thereafter, the computer 46 causes (142) readjustment of the molding system as shown in FIG. 1 to prevent disengagement of the channel-encasing mold parts 18, 20 and thereby enable (a) the injection of a predetermined quantity of molten plastic material into the channel 54 to form an insulated runner 66 in the channel 54, as described above with reference to FIG. 2, and (b) the injection of further molten plastic material through the insulated runner 66 into the mold cavities 50, 52 in accordance with the parameters of the molding sequence including a plurality of injection molding cycles, as described above with reference to FIG. 3.

Referring to FIG. 1, the computer 46 causes (142) readjustment of the molding system by operating the first set of hydraulic rack-fastening mechanisms 30 to remotely unfasten each of the racks 63 from the movable platen 24 and by operating the second set of hydraulic rack-fastening mechanisms 32 to remotely fasten each of the racks 63 to the stationary platen 22, to thereby attach each of the second racks 63 to only the stationary platen 22; operating the first set of hydraulic mold-latching mechanisms 34 to latch the other of the first pair of mold-cavity-encasing mold parts 12 to the other of the second pair of mold-cavity-encasing mold parts 14; and operating the second set of hydraulic mold-latching mechanisms 36 to unlatch the second pair of mold-cavity-encasing mold parts 14, 16 from one another, so that only the mold-cavity-encasing mold parts 10, 12, 14, 16 are disengaged when the movable platen 24 is moved to the left by the hydraulic positioning mechanism 26, as shown in FIG. 4.

The detectors 112 sense (142) the readjustment of the molding system as shown in FIG. 1 that prevents disengagement of the mold-cavity-encasing mold parts 18, 20. In automatic response to (144) sensing said readjustment of the molding system by the detectors 112, and at a predetermined time thereafter, the computer 46 causes (146) metering of the predetermined quantity of molten plastic material for the initial injection into the channel 54 to form the insulated runner 66.

A detector (not shown) coupled to the computer 46 senses (146) the metering of the predetermined quantity of molten plastic material for the initial injection into the channel 54. In automatic response to (148) sensing the metering of the predetermined quantity of molten plastic material for the initial injection into the channel 54 by said detector, and at a predetermined time thereafter, the computer 46 causes (150) injection of the predetermined quantity of plastic material into the channel 54 to form the insulated runner 66.

A detector (not shown) coupled to the computer 46 senses (152) completion of the injection of the predetermined quantity of molten plastic material into the channel 54. In automatic response to (152) sensing completion of the injection of the predetermined quantity of molten plastic material into the channel 54 by said detector, and at a predetermined time thereafter, the computer 46 causes (154) initiation of injection of further plastic material through the insulated runner 66 into the mold cavities 50, 52 in accordance with the parameters of the molding sequence including a plurality of injection molding cycles, as described above with reference to FIGS. 1, 2, 3 and 4.

A timer 156 (shown by dashed lines in FIG. 13) implemented in the computer 46 is utilized in various alternative embodiments of the method shown by the solid lines of FIG. 13 in lieu of one or more of the detectors utilized in the above described steps of (140) sensing the re-engagement of the channel-encasing mold parts 18, 20, (144) sensing the readjustment of the molding system, (148) sensing the metering of the predetermined quantity of molten plastic material for the initial injection into the channel 54, and (152) sensing completion of the injection of the predetermined quantity of molten plastic material into the channel 54. In one such alternative embodiment, as shown by the dashed lines of FIG. 13, the timer 156 is set by (134) the manual operation by the operator incident to the closing of the machine gate 48 while the channel-encasing mold parts 18, 20 are disengaged. In other such alternative embodiments, the timer 156 is set by (140) sensing the reengagement of the channel-encasing mold parts 18, 20; (144) sensing the readjustment of the molding system; (148) sensing the metering of the predetermined quantity of molten plastic material for the initial injection into the channel 54; and/or (152) sensing the completion of the injection of the predetermined quantity of molten plastic material into the channel 54 to control the timing of one or more of the respectively subsequent readjustment operation 142; the metering operation 146; (150) the injection of the predetermined quantity of plastic material into the channel 54 to form the insulated runner 66; and (154) the initiation of injection of further plastic through the runner 66 into the mold cavities 50, 52 in accordance with the molding sequence including a plurality of injection molding cycles.

In automatic response to (134) the manual operation by the operator incident to the closing of the machine gate 48 while the channel-encasing mold parts 18, 20 are disengaged, at predetermined times after (134) such manual operation by the operator, as indicated by the timer 156, the computer 46 sequentially causes (136) the re-engagement of the channel-encasing mold parts 18, 20, (142) the readjustment of the molding system that prevents disengagement of the mold-cavity-encasing mold parts 18, 20, (146) the metering of the predetermined quantity of molten plastic material for the initial injection into the channel 54, (150) the injection of the predetermined quantity of plastic material into the channel 54 to form the insulated runner 66, and (154) initiation of injection of further plastic material through the insulated runner 66 into the mold cavities 50, 52 in accordance with the parameters of the molding sequence including a plurality of injection molding cycles.

The predetermined time after (134) the manual operation by the operator incident to the closing of the machine gate 48 at which the readjustment operation 142 is initiated by the computer 46 allows for the time required to complete the re-engagement operation 138. The predetermined time after such manual operation 134 at which the metering operation 146 is initiated by the computer 46 allows for the time required to complete the re-engagement operation 138 and the time required to complete the readjustment operation 142. The predetermined time after such manual operation 134 at which the initial injection operation 150 is initiated by the computer 46 allows for the time required to complete the re-engagement operation 138, the time required to complete the readjustment operation 142 and the time required to complete the metering operation 146. The predetermined time after such manual operation 134 at which the computer 46 causes (154) the initiation of injection of further plastic material through the insulated runner 66 into the mold cavities 50, 52 allows for the time required to complete the re-engagement operation 138, the time required to complete the readjustment operation 142, the time required to complete the metering operation 146, the time required to complete the initial injection operation 150 and the time required for the initially injected plastic material to cool sufficiently to form the insulated runner 66.

In other alternative embodiments, less than all of (136) the re-engagement of the channel-encasing mold parts 18, 20, (142) the readjustment of the molding system that prevents disengagement of the mold-cavity-encasing mold parts 18, 20, (146) the metering of the predetermined quantity of molten plastic material for the initial injection into the channel 54, (150) the injection of the predetermined quantity of plastic material into the channel 54 to form the insulated runner 66, and (154) initiation of injection of further plastic material through the insulated runner 66 into the mold cavities 50, 52 in accordance with the parameters of the molding sequence including a plurality of injection molding cycles are in automatic response to a sensing operation as shown by the solid lines of FIG. 13, and the remainder thereof occur(s) at a predetermined time as measured by the timer 156, as shown by the dashed lines of FIG. 13.

In the preferred embodiment, none of (136) the re-engagement of the channel-encasing mold parts 18, 20, (142) the readjustment of the molding system that prevents disengagement of the mold-cavity-encasing mold parts 18, 20, (146) the metering of the predetermined quantity of molten plastic material for the initial injection into the channel 54, (150) the injection of the predetermined quantity of plastic material into the channel 54 to form the insulated runner 66, and (154) initiation of injection of further plastic material through the insulated runner 66 into the mold cavities 50, 52 in accordance with the parameters of the molding sequence including a plurality of injection molding cycles is in response to any manual operation that occurs subsequent to (134) the manual operation by the operator incident to the closing of the machine gate 48 while the channel-encasing mold parts 18, 20 are disengaged. In other embodiments one or more of such operations (136), (142), (146), (150), (154) is in response to a manual operation that occurs subsequent to (134) the manual operation by the operator incident to the closing of the machine gate 48 while the channel-encasing mold parts 18, 20 are disengaged.

In another alternative embodiment, the machine gate 48 is not opened following (116) full disengagement of the channel-encasing mold parts 18, 20 and the timer 156 is not set by (134) a manual operation incident to closure of the machine gate 48. In such embodiment, (136) the re-engagement of the channel-encasing mold parts 18, 20 can be in automatic response to (120) sensing full disengagement of the channel-encasing mold parts 18, 20, or alternatively in response to a signal irom the timer 156, with the timer 156 being set by either (108) sensing engagement of the mold-cavity-encasing mold parts 10, 12, 14, 16; (114) sensing adjustment of the molding system to enable disengagement of the channel-encasing mold parts 18, 20; or (120) sensing full disengagement of the channel encasing mold parts 18, 20.

For the various embodiments described herein, either with reference to the Drawing or in general terms, the predetermined time at which one operation occurs after another operation, as determined by a timer within the computer 46, may be essentially zero for those operations that need not wait upon the completion of an intervening operation.

The computer 46 is programmed by computer programs embodied in a computer readable storage medium 170 for controlling the respective operations of the above-described injection molding systems. The computer readable storage medium 170 is configured to cause the respective above-described operations of the injection molding systems. The computer readable storage medium 170 is embodied in the hardware of the computer 46 and/or in computer software, such as a floppy disk or a CD-ROM.

In addition to the above-described system, the multiple-parting injection molding systems with which the method of the present invention is used includes desynchronously operated stack molding systems, such as described in U.S. Pat. No. 5,043,129 to Sorensen.

The method of the present invention also is used with single-parting injection molding systems.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injection molding system includes a machine gate for controlling access to a space between disengaged channel-encasing mold parts, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, closing the machine gate;

(d) in automatic response to a manual operation incident to said closure of the machine gate, adjusting the molding system in order to enable further said steps (a) and (b);

(e) sensing said adjustment of the molding system; and (f) in automatic response to sensing said adjustment of the molding system, metering said predetermined quantity of molten plastic material for injection during a further said step (a).

2. A method according to claim 1, wherein step (f) is not in response to any other manual operation that is initiated subsequent to step (e).

3. A method according to claim 1, further comprising the steps of:

(g) sensing said metering of said predetermined quantity of molten plastic material;

(h) in automatic response to sensing said metering of said predetermined quantity of molten plastic material, initiating said further step (a);

(i) sensing completion of said further step (a); and (j) in automatic response to sensing completion of said further step (a), initiating a further said step (b).

4. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injection molding system includes a machine gate for controlling access to a space between disengaged channel-encasing mold parts, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, closing the machine gate; and (d) in automatic response to a manual operation incident to said closure of the machine gate, metering said predetermined quantity of molten plastic material for injection during a further said step (a).

5. A method according to claim 4, wherein step (d) is not in response to any other manual operation that is initiated subsequent to said incident operation.

6. A method according to claim 4, wherein the injected molten plastic material is further conducted through at least one gate located in the channel;

wherein commencement of step (b) is delayed for a predetermined period after conclusion of step (a); and wherein the metered predetermined quantity of molten plastic material is such that the insulated runner formed during step (a) does not extend to any of the at least one gate.

7. A method according to claim 4, wherein commencement of step (b) is delayed for a predetermined period after conclusion of step (a); and wherein the metered predetermined quantity of molten plastic material is such that the insulated runner formed during step (a) covers the mold-part-separation lines.

8. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injection molding system includes a machine gate for controlling access to a space between disengaged channel-encasing mold parts, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, closing the machine gate; and (d) in automatic response to a manual operation incident to said closure of the machine gate, initiating a further said step (a).

9. A method according to claim 8, wherein step (d) is not in response to any other manual operation that is initiated subsequent to said incident operation.

10. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injection molding system includes a machine gate for controlling access to a space between disengaged channel-encasing mold parts, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, closing the machine gate; and (d) in automatic response to a manual operation incident to said closure of the machine gate, initiating a further said step (b).

11. A method according to claim 10, wherein step (d) is not in response to any other manual operation that is initiated subsequent to said incident operation.

12. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, re-engaging the channel-encasing mold parts;

(d) sensing said re-engagement of the channel-encasing mold parts;

(e) in automatic response to sensing said re-engagement of the channel-encasing mold parts, adjusting the molding system in order to enable further said steps (a) and (b);

(f) sensing said adjustment of the molding system; and (g) in automatic response to sensing said adjustment of the molding system, metering said predetermined quantity of molten plastic material for injection during a further said step (a).

13. A method according to claim 12, further comprising the steps of:

(h) sensing said metering of said predetermined quantity of molten plastic material;

(i) in automatic response to sensing said metering of said predetermined quantity of molten plastic material, initiating said further step (a);

(j) sensing completion of said further step (a); and (k) in automatic response to sensing completion of said further step (a), initiating a further said step (b).

14. A method according to claim 12, wherein step (g) is not in response to any manual operation that is initiated subsequent to step (f).

15. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, re-engaging the channel-encasing mold parts;

(d) sensing said re-engagement of the channel-encasing mold parts; and (e) in automatic response to sensing said re-engagement of the channel-encasing mold parts, metering said predetermined quantity of molten plastic material for injection during a further said step (a).

16. A method according to claim 15, wherein step (e) is not in response to any manual operation that is initiated subsequent to step (d).

17. A method according to claim 15, wherein the injected molten plastic material is further conducted through at least one gate located in the channel;

wherein commencement of step (b) is delayed for a predetermined period after conclusion of step (a); and wherein the metered predetermined quantity of molten plastic material is such that the insulated runner formed during step (a) does not extend to any of the at least one gate.

18. A method according to claim 15, wherein commencement of step (b) is delayed for a predetermined period after conclusion of step (a); and wherein the metered predetermined quantity of molten plastic material is such that the insulated runner formed during step (a) covers the mold-part-separation lines.

19. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, re-engaging the channel-encasing mold parts;

(d) sensing said re-engagement of the channel-encasing mold parts; and (e) in automatic response to sensing said re-engagement of the channel-encasing mold parts, initiating a further said step (a).

20. A method according to claim 19, wherein step (e) is not in response to any manual operation that is initiated subsequent to step (d).

21. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, re-engaging the channel-encasing mold parts;

(d) sensing said re-engagement of the channel-encasing mold parts; and (e) in automatic response to sensing said re-engagement of the channel-encasing mold parts, initiating a further said step (b).

22. A method according to claim 21, wherein step (e) is not in response to any manual operation that is initiated subsequent to step (d).

23. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, adjusting the molding system in order to enable further said steps (a) and (b);

(d) sensing said adjustment of the molding system; and (e) in automatic response to sensing said adjustment of the molding system, metering said predetermined quantity of molten plastic material for injection during a further said step (a).

24. A method according to claim 23, wherein step (e) is not in response to any manual operation that is initiated subsequent to step (d).

25. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, adjusting the molding system in order to enable further said steps (a) and (b);

(d) sensing said adjustment of the molding system; and (e) in automatic response to sensing said adjustment of the molding system, initiating a further said step (a).

26. A method according to claim 25, wherein step (e) is not in response to any manual operation that is initiated subsequent to step (d).

27. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, adjusting the molding system in order to enable further said steps (a) and (b);

(d) sensing said adjustment of the molding system; and (e) in automatic response to sensing said adjustment of the molding system, initiating a further said step (b).

28. A method according to claim 27, wherein step (e) is not in response to any manual operation that is initiated subsequent to step (d).

29. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, metering said predetermined quantity of molten plastic material for injection during a further said step (a).

(d) sensing said metering of said predetermined quantity of molten plastic material; and (e) in automatic response to sensing said metering of said predetermined quantity of molten plastic material, initiating a further said step (a).

30. A method according to claim 29, wherein step (e) is not in response to any manual operation that is initiated subsequent to step (d).

31. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, metering said predetermined quantity of molten plastic material for injection during a further said step (a);

(d) sensing said metering of said predetermined quantity of molten plastic material; and (e) in automatic response to sensing said metering of said predetermined quantity of molten plastic material, initiating a further said step (b).

32. A method according to claim 31, wherein step (e) is not in response to any manual operation that is initiated subsequent to step (d).

33. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the core eventually solidifies to form a sprue, the method comprising the steps of:

(a) injecting a predetermined quantity of molten plastic material into the channel to form an insulated runner in the channel;

(b) injecting further molten plastic material through the insulated runner into the at least one mold cavity in accordance with parameters of a molding sequence including a plurality of injection molding cycles;

(c) subsequent to removal of the sprue, initiating a, further said step (a);

(d) sensing completion of said further step (a); and (e) in automatic response to sensing completion of said further step (a), initiating a further said step (b).

34. A method according to claim 33, wherein step (e) is not in response to any manual operation that is initiated subsequent to step (d).

35. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, the method comprising the steps of:

(a) injecting an initial predetermined quantity of molten plastic material into the channel;

(b) cooling the plastic material injected during step (a) for an initial predetermined cooling period to form an insulated runner in the channel;

(c) injecting further molten plastic material through the insulated runner toward the at least one mold cavity in accordance with parameters of a plurality of injection molding cycles; and (d) cooling the plastic material injected into the at least one mold cavity for predetermined product cooling periods during said plurality of injection molding cycles to solidify plastic products in the at least one mold cavity; and (e) ejecting the solidified plastic products from the at least one mold cavity after each said product cooling period during said plurality of injection molding cycles;

wherein the first occurring said product cooling period is of longer duration than a later said product cooling period to thereby at least significantly reduce drooling into the at least one mold cavity during step (e) of said molten plastic material injected during step (c) as compared to such drooling as would occur if the first occurring said product cooling period were not of longer duration than the later said product cooling period; and wherein the initial predetermined cooling period during step (b) is of longer duration than any said predetermined product cooling period during step (d).

36. A method of operating and controlling an insulated runner injection molding system that includes separable mold-cavity-encasing mold parts which encase at least one mold cavity and further includes separable channel-encasing mold parts which encase a channel in which injected plastic material forms an insulated runner with a solidified insulating plastic shell and a molten plastic core for conducting further injected molten plastic material toward the at least one mold cavity, wherein the injected molten plastic material is further conducted through at least one gate located in the channel, the method comprising the steps of:

(a) injecting a predetermined quantity of molten plastic material into the channel to form an insulated runner in the channel; and (b) injecting further molten plastic material through the insulated runner and the at least one gate into the at least one mold cavity in accordance with parameters of a plurality of injection molding cycles;

wherein commencement of step (b) is delayed for a predetermined period after conclusion of step (a); and wherein step (a) comprises injecting such a predetermined quantity of molten plastic material that the insulated runner formed during step (a) does not extend to any of the at least one gate;

wherein the insulated runner includes a plurality of branches for conducting molten plastic material to a respective plurality of said mold cavities, and wherein step (a) comprises the step of:

(c) controlling the quantity of said molten plastic material respectively injected into different said branches by separately controlling a quantity of air escaping from the different branches during said injection.

37. A method according to claim 36, wherein step (c) comprises the step of:

(d) separately controlling the quantity of air escaping from the different branches during said injection by separately controlling a quantity of air vented from the respective mold cavities.

38. A method of operating and controlling an insulated runner injection molding system that includes separable mold-cavity-encasing mold parts which encase at least one mold cavity and further includes separable channel-encasing mold parts which encase a channel having mold-part-separation lines, in which channel injected plastic material forms an insulated runner with a solidified insulating plastic shell and a molten plastic core for conducting further injected molten plastic material toward the at least one mold cavity, the method comprising the steps of:

(a) injecting a predetermined quantity of molten plastic material into the channel to form an insulated runner in the channel; and (b) injecting further molten plastic material through the insulated runner and the at least one gate into the at least one mold cavity in accordance with parameters of a plurality of injection molding cycles;

wherein commencement of step (b) is delayed for a predetermined period after conclusion of step (a); and wherein step (a) comprises injecting such a predetermined quantity of molten plastic material that the insulated runner formed during step (a) covers the mold-part-separation lines;

wherein the insulated runner includes a plurality of branches for conducting molten plastic material to a respective plurality of said mold cavities, and wherein step (a) comprises the step of:

(c) controlling the quantity of said molten plastic material respectively injected into different said branches by separately controlling a quantity of air escaping from the different branches during said injection.

39. A method according to claim 38, wherein step (c) comprises the step of:

(d) separately controlling the quantity of air escaping from the different branches during said injection by separately controlling a quantity of air vented from the respective mold cavities.

* * * * *